United States Patent [19]

Narita et al.

[11] Patent Number: 5,703,671
[45] Date of Patent: Dec. 30, 1997

[54] SHADING CORRECTION METHOD, PHOTOGRAPHIC PRINTER AND INDEX PRINT PRODUCTION APPARATUS

[75] Inventors: Toshihiko Narita; Hiroaki Nakamura; Kazuhiko Katakura; Yoshihito Nakaya, all of Kanagawa, Japan

[73] Assignee: Fuji Photo Film Co., Ltd., Kanagawa, Japan

[21] Appl. No.: 703,356

[22] Filed: Aug. 26, 1996

[30] Foreign Application Priority Data

| Aug. 28, 1995 | [JP] | Japan | 7-218710 |
| Sep. 7, 1995 | [JP] | Japan | 7-230186 |
| Jul. 12, 1996 | [JP] | Japan | 8-183524 |

[51] Int. Cl.⁶ .......... G03B 27/32; G03B 27/52
[52] U.S. Cl. .......... 355/32; 355/35; 345/904; 345/150; 345/188; 348/766
[58] Field of Search .......... 355/67, 70, 68, 355/69, 71, 32, 35, 37, 38, 54, 46, 40; 345/904, 150, 188; 348/766–775, 180; 349/1–4

[56] References Cited

U.S. PATENT DOCUMENTS

| 4,805,039 | 2/1989 | Otake et al. | 358/335 |
| 5,105,215 | 4/1992 | Liu | 355/71 |
| 5,184,227 | 2/1993 | Foley | 358/302 |
| 5,293,178 | 3/1994 | Kobayashi | 348/92 |
| 5,447,827 | 9/1995 | Ishikawa et al. | 355/54 |
| 5,502,541 | 3/1996 | Olliver | 355/38 |
| 5,579,132 | 11/1996 | Takahashi et al. | 358/527 |

Primary Examiner—R. L. Moses
Assistant Examiner—Shival Virmani
Attorney, Agent, or Firm—Sughrue, Mion, Zinn, Macpeak & Seas, PLLC

[57] ABSTRACT

A method of correcting the light amount irregularities for a photographic printer in which an image displayed on a two-dimensional display unit is exposed by transmitting or reflecting the light from a light source through or from the two-dimensional display unit is disclosed. An LED light source is turned on with a predetermined driving voltage applied to all the pixels of a liquid crystal panel. The image on the liquid crystal panel is exposed for a predetermined length of time by the light transmitted through the liquid crystal panel and developed thereby to produce a photographic print. The density at a point corresponding to each pixel of the liquid crystal panel is measured. The light transmittance correction amount for each pixel of the liquid crystal panel is determined in such a manner that the density measured at each point conforms to a predetermined reference density (a minimum value of density measurement, for example). The driving voltage correction data for each pixel of the liquid crystal panel is calculated on the basis of the light transmittance correction amount thus determined.

20 Claims, 21 Drawing Sheets

1

SHADING CORRECTION METHOD, PHOTOGRAPHIC PRINTER AND INDEX PRINT PRODUCTION APPARATUS

BACKGROUND OF THE INVENTION

1. Field of the Invention

The present invention relates to a photographic printer and a shading correction method for the photographic printer, in which the light from a light source is irradiated on a two-dimensional display unit with an image displayed thereon and a photosensitive material is exposed by the light transmitted through or reflected from the two-dimensional display unit.

The invention also relates to an index print production apparatus for producing an index print by displaying on a liquid crystal panel and exposing an image including a predetermined number of frame images arranged in a predetermined way and recorded in a photographic film, and a method for correcting the shading by adjusting the light transmittance of pixels of the liquid crystal panel on the basis of the shading correction data in an image display area of the liquid crystal panel.

2. Description of the Related Art

In a conventionally well-known index print, frames are arranged in matrix as a compressed print to permit easy search to determine what photographs are taken in each developed negative Film. What is called a digital photographic printer has been suggested as a technique for producing this index print, in which the image data of each frame of a negative film read by a predetermined scanner in the photographic printer are stored in a predetermined image memory. Several frames of the image data are read from the image memory and displayed on a two-dimensional display unit such as a liquid crystal panel at predetermined timings, irradiated with the light from a light source, and exposed on the printing paper by the light transmitted through or reflected from the frames.

In the prior art, however, the light amount from a light source or the light amount transmitted through or reflected from a device of an optical system is different between the center and the peripheral portion of the light source or the device of the optical system, as the case may be. Under normal conditions where the light transmittance or reflectance is uniform in a two-dimensional display unit, therefore, the light amount at the central portion of the exposure light is considerably different from that at the peripheral portion thereof (in what is called the light amount irregularities). This differentiates the density at the central portion from that at the peripheral portion of the photographic print produced by exposure, thereby causing what is called the print irregularities.

In a conventional photographic printer, a light diffusion unit is interposed between a light source and a negative film to diffuse the light and thereby eliminate the difference in exposure light amount between the central and peripheral portions of the printing paper thereby to prevent the print irregularities. Nevertheless, some two-dimensional display units for digital photographic printers such as a liquid crystal display (LCD) or a digital micromirror display (DMD) have such a characteristic as not to transmit or reflect light other than parallel light. Even in the case where light is diffused by a light diffusion unit as in the prior art, therefore, the only effect is a reduced amount of the light (parallel light) transmitted through or reflected from the two-dimensional display unit. The conventional techniques thus substantially fail to produce the effect of preventing print irregularities.

2

On the other hand, an LED light source configured of a multiplicity of light-emitting diodes (LED) has recently replaced a lamp light source such as a halogen lamp and has come into widespread use as a light source for photographic printers. As compared with the lamp light sources, the LED light source has the advantages of a very small heat generation when turned on, the ease of the lighting operation control, and a smaller size. The LED light source thus is used also for the digital photographic printer.

In spite of this, the LED light source, which is a planar light source composed of a multiplicity of LEDs built therein as minuscule light-emitting devices, is liable to cause light amount variations from one point to another, i.e., light amount irregularities.

SUMMARY OF THE INVENTION

The present invention has been developed in order to obviate the above-mentioned problems, and a first object thereof is to provide a shading correction method capable of correcting the light amount irregularities in a photographic printer adapted to expose an image displayed on a two-dimensional display unit by the light of a light source transmitted through or reflected from the two-dimensional display unit, or the photographic printer capable of executing the shading correction method.

A second object of the invention is to provide a shading correction method capable of reducing the processing burden or an index print production apparatus capable of executing the shading correction method.

In order to achieve the first object, according to a first aspect of the present invention, there is provided a shading correction method for a photographic printer in which each pixel of a two-dimensional display unit is controlled in accordance with an image data signal thereby to display an image on the two-dimensional display unit, light from a light source is irradiated on the two-dimensional display unit with the image displayed thereon, and the image is exposed on a photosensitive material by the light transmitted through or reflected from the two-dimensional display unit, the method comprising the steps of turning on the light source by setting all the pixels of the two-dimensional display unit in a predetermined driven state, measuring the density of each pixel of the image formed by the light transmitted through or reflected from the two-dimensional display unit corresponding to each pixel of the two-dimensional display unit, calculating the correction amount of the light transmittance or reflectance of each pixel of the two-dimensional display unit on the basis of the density of each pixel of the image corresponding to each pixel of the two-dimensional display unit, and correcting selected one of the driving conditions of each pixel and the image data signal for displaying the image on the two-dimensional display unit.

According to a second aspect of the invention, there is provided a shading correction method similar to the first aspect of the invention, in which the driving voltage of each pixel is corrected in order to correct the driving conditions of each pixel of the two-dimensional display unit.

According to a third aspect of the invention, there is provided a shading correction method for a photographic printer in which an image is displayed on a liquid crystal panel by controlling each pixel of the liquid crystal panel in accordance with an image data signal, and light from a light source is irradiated on the liquid crystal panel with the image displayed thereon, and the image is exposed on a photosensitive material by the light transmitted through the liquid crystal panel, the method comprising the steps of turning on the light source by setting all the pixels of the liquid crystal panel in a predetermined driven state, measuring the density of each pixel of an image formed by the light transmitted through the liquid crystal panel corresponding to each pixel of the liquid crystal panel, calculating the correction amount of the light transmittance of each pixel of the liquid crystal panel on the basis of the density of each pixel of the image corresponding to each pixel of the liquid crystal panel, and correcting selected one of the image data signal and the driving conditions of each pixel for displaying an image on the liquid crystal panel on the basis of the correction amount of the light transmittance.

In the first aspect of the invention, first, a light source is turned on with all the pixels of a two-dimensional display unit set in a predetermined driven state. The light source may be a lamp light source such as a halogen lamp or an LED light source. Any type of two-dimensional display unit may be employed in which all the pixels can be set in a uniform driven state. For example, all the pixels may be set in full transmission or full reflection state.

The density is measured of each pixel of an image formed by the light transmitted through or reflected from the two-dimensional display unit corresponding to each pixel of the two-dimensional display unit. The density variations of the pixels measured are caused by the variations in the light amount transmitted or reflected at different points of a device of the optical system.

On the basis of the density of each image pixel corresponding to each pixel of the two-dimensional display unit, the correction amount of the light transmittance or reflectance of each pixel is calculated in such a manner that all the pixels have the density conforming to a predetermined reference density (such as the minimum, maximum or average value of the image density measurement). The resulting correction amount of the light transmittance or reflectance is used to correct the image data signal or the pixel driving conditions for displaying the image on the two-dimensional display unit.

The characteristics of light transmittance or reflectance and the driving voltage of each pixel of a two-dimensional display unit have a predetermined relation with each other. In view of this, as in the second aspect of the invention, a correction amount of the drive voltage of each pixel of a two-dimensional display unit corresponding to the correction amount of the light transmittance or reflectance may be determined thereby to correct the driving conditions of each pixel for displaying an image on the two-dimensional display unit.

In the case where the driving voltage thus corrected is applied to each pixel of the two-dimensional display unit, the density of each pixel of the image formed by the light transmitted through or reflected from the two-dimensional display unit conforms to a predetermined reference density. In other words, the light amount irregularities of the transmitted or reflected light due to the light amount variations of the light source or the variations of the light amount transmitted or reflected at different points of an optical system device including a focusing lens for exposure are corrected by the correction amount of light transmittance or reflectance. In this way, a uniform light amount distribution, and hence, a uniform print density distribution is obtained, thereby preventing the print irregularities which otherwise might be caused by the light amount irregularities.

Especially when using an LED light source which is liable to produce light amount irregularities, the above-mentioned correction of the irregularities of the transmitted or reflected light amount is very effective.

The driving conditions of each pixel of a two-dimensional display unit according to the first aspect of the invention may be corrected by the temporal modulation of an applied driving voltage as in duty control, as well as by the driving voltage correction for each pixel as according to the second aspect.

Also, the above-mentioned two-dimensional display unit may be a liquid crystal display panel (LCD, hereinafter referred to as the liquid crystal panel). In the case where a liquid crystal panel is used as a two-dimensional display unit, as according to the third aspect of the invention, a light source is turned on with all the pixels of the liquid crystal panel set in a predetermined driven state, the density of each pixel of the image formed by the light transmitted through the liquid crystal panel corresponding to each pixel of the liquid crystal panel is measured, the correction amount of the light transmittance of each pixel of the liquid crystal panel is calculated on the basis of the density of each pixel of the image corresponding to each pixel of the liquid crystal panel, and the driving conditions of each pixel or the image data signal for displaying an image on the liquid crystal panel is corrected on the basis of the correction amount of the light transmittance.

In order to achieve the above-mentioned object, according to a fourth aspect of the invention, there is provided a photographic printer for displaying an image on a two-dimensional display unit by controlling each pixel of the two-dimensional display unit in accordance with an image data signal, irradiating the light from a light source on the two-dimensional display unit with the image displayed thereon, and exposing the image on a photosensitive material to the light transmitted through or reflected from the two-dimensional display unit, the photographic printer comprising density measuring means for measuring the density of each pixel of the image formed by the light transmitted through or reflected from the two-dimensional display unit corresponding to each pixel of the two-dimensional display unit with all the pixels of the two-dimensional display unit set in a predetermined driven state, correction amount calculation means for calculating the correction amount of light transmittance or light reflectance of each pixel of the two-dimensional display unit on the basis of the density of each pixel measured by the density measuring means, and correction control means for correcting the image data signal or the driving conditions of each pixel for displaying the image on the two-dimensional display unit on the basis of the correction amount of light transmittance or light reflectance calculated by the correction amount calculation means.

In the photographic printer according to the fifth aspect of the invention, the driving voltage of each pixel of the two-dimensional display unit is corrected by the correction control means of the photographic printer of the fourth aspect of the invention, thereby correcting the driving conditions of each pixel of the two-dimensional display unit.

According to a sixth aspect of the invention, there is provided a photographic printer for displaying an image on a liquid crystal panel by controlling each pixel of the liquid crystal panel according to an image data signal, irradiating the light from a light source on the liquid crystal panel with the image displayed thereon, and exposing the image on a photosensitive material by the light transmitted through the liquid crystal panel, the photographic printer comprising liquid crystal density measuring means for measuring the density of each pixel of the image formed by the light transmitted through the liquid crystal panel corresponding to each pixel of the liquid crystal panel with all the pixels of the liquid crystal panel set in a predetermined driven state, transmittance correction amount calculation means for calculating the correction amount of the light transmittance of each pixel of the liquid crystal panel on the basis of the density of each pixel measured by the liquid crystal density measuring means, and liquid crystal pixel correction control means for correcting the image data signal or the driving conditions of each pixel for displaying the image on the liquid crystal panel on the basis of the light transmittance correction amount calculated by the transmittance correction amount calculation means.

In the fourth aspect of the invention, the density measuring means measures the density of each pixel of an image formed by the light transmitted through or reflected from a two-dimensional display unit corresponding to each pixel of the two-dimensional display unit with all the pixels of the two-dimensional display unit set in a predetermined driven state, and the correction amount calculation means calculates the light transmittance or light reflectance correction amount for each pixel of the two-dimensional display unit in such a manner that the density of all the pixels conforms to a predetermined reference density (such as the maximum, minimum or average density value of the pixels measured) on the basis of the density measurement of each pixel.

Further, the correction control means corrects the image data signal or the driving conditions of each pixel of the two-dimensional display unit for displaying an image on the two-dimensional display unit on the basis of the light transmittance or light reflectance correction amount of each pixel.

As described above, the characteristics of the light transmittance or reflectance of each pixel and the driving voltage of a two-dimensional display unit have a predetermined relation with each other. As with the fifth aspect of the invention, therefore, the correction control means can correct the driving conditions of each pixel of the two-dimensional display unit by correcting the driving voltage of each pixel of the two-dimensional display unit with reference to the characteristic relation between the light transmittance or reflectance and the driving voltage of each pixel.

In the fourth or fifth aspect of the invention, a structure for executing the shading correction is built in what is called a digital photographic printer, so that the shading correction is easily accomplished also by using an exposure system device of the two-dimensional display unit. In other words, the shading can be corrected easily without any photometry unit or the like.

The correction control means may correct the driving conditions of each pixel of a two-dimensional display unit by temporal modulation of the applied driving voltage as in duty control, for example, instead of by the method according to the fifth aspect of the invention.

Also, a two-dimensional display unit according to the fourth aspect may use a liquid crystal panel. More specifically, in the case where a liquid crystal panel is used as a two-dimensional display unit for the photographic printer according to the sixth aspect, the liquid crystal density measuring means measures the density of each pixel of an image formed by the light transmitted through the liquid crystal panel corresponding to each pixel of the liquid crystal panel with all the pixels of the liquid crystal panel set in a predetermined driven state, and the transmittance correction amount calculation means calculates the light transmittance correction amount of each pixel of the liquid crystal panel on the basis of the pixel density measured. Also, the liquid crystal pixel correction control means corrects the image data signal or the driving conditions of each pixel of the liquid crystal for displaying an image on the liquid crystal panel on the basis of the light transmittance correction amount calculated.

In order to achieve the second object, according to a seventh aspect of the invention, there is provided a shading correction method in which an index print is produced by displaying on the two-dimensional display unit and exposing an image including a predetermined number of frame images arranged in a predetermined manner and recorded in a photographic film in such a manner that the light transmittance or light reflectance of each pixel of the two-dimensional display unit is adjusted on the basis of the shading correction data for an image display area of the two-dimensional display unit, the method comprising the step of correcting the shading of only the portion of the image display area having the frame images arranged in the predetermined manner.

According to the seventh aspect of the invention, an image including a predetermined number of frame images arranged in a predetermined manner and recorded in a photographic film is displayed on a two-dimensional display unit and exposed to produce an index print. In the process, the shading is corrected of only that portion of the image display area of the liquid crystal panel in which has the frame images arranged. In other words, the light transmittance or light reflectance is adjusted only for the pixels of that portion of the image display area in which the frame images are arranged, thereby preventing print irregularities in the frame images of the index print.

Since only the portion including an arrangement of frame images but not the whole image display area of a two-dimensional display unit is subjected to shading correction, as described above, the burden of shading correction can be reduced. Further, the processing time required for the shading correction can be shortened, while at the same time saving the memory capacity for storing the shading correction data required for execution of the shading correction process. Either a negative film or a positive film may be used as the photographic film.

In order to achieve the second object, according to an eighth aspect of the invention, there is provided an index print production apparatus for producing an index print by displaying on a two-dimensional display unit and exposing an image including a predetermined number of frame images arranged in a predetermined manner and recorded in a photographic film, the apparatus comprising correction data production means for detecting the irregularities of the light amount transmitted through or reflected from an image display area of the two-dimensional display unit and producing the shading correction data as the amount of light transmittance adjustment or light reflectance adjustment of each pixel of the image display area, extraction means for extracting the shading correction data corresponding to the positions of the frame images from the shading correction data for the image display area produced by the correction data production means, and correction means for correcting the shading by adjusting the light transmittance or light reflectance of the pixels of the two-dimensional display unit For each frame image on the basis of the shading correction data of each frame image extracted by the extraction means.

According to the eighth aspect of the invention, the correction data production means detects the irregularities of the light amount transmitted through or reflected from an image display area of a two-dimensional display unit, and produces the shading correction data as the light transmittance adjustment amount or the light reflectance adjustment amount of each pixel in the image display area. Also, the extraction means extracts the shading correction data corresponding to the frame image positions from the shading correction data produced, and the correction means corrects the shading by adjusting the light transmittance or light reflectance of each pixel of the two-dimensional display unit for each frame image on the basis of the shading correction data of each frame image extracted.

A predetermined number of the frame images corrected in shading in this way are arranged in a predetermined manner and displayed on the two-dimensional display unit and exposed thereby to produce an index print.

According to the eighth aspect of the invention, like the seventh aspect thereof, only that portion of the image display area in which the frame images are arranged, instead of the whole area, of the two-dimensional display unit is corrected in shading. The burden of shading correction by the correction means can therefore be reduced.

Also, according to the eighth aspect of the invention, the shading is corrected for each frame image of the index print data. Therefore, the unit time of shading correction can be reduced, thereby making it possible to avoid the protracted occupancy of the CPU. This feature is very effective especially when a single CPU performs not only the shading correction but also the input, processing, arrangement and printing of images.

The above and other objects, features and advantages of the present invention will become apparent from the following description and the appended claims, taken in conjunction with the accompanying drawings in which preferred embodiments of the present invention are shown by way of illustrated examples.

BRIEF DESCRIPTION OF THE DRAWINGS

The invention will now be described with reference to the accompanying drawings, wherein.

DESCRIPTION OF THE PREFERRED EMBODIMENTS

The present invention will be explained below with reference to embodiments using a liquid crystal panel as a two-dimensional display unit.

[First embodiment]

A first embodiment of the invention will be explained with reference to the accompanying drawings.

Figure 1:
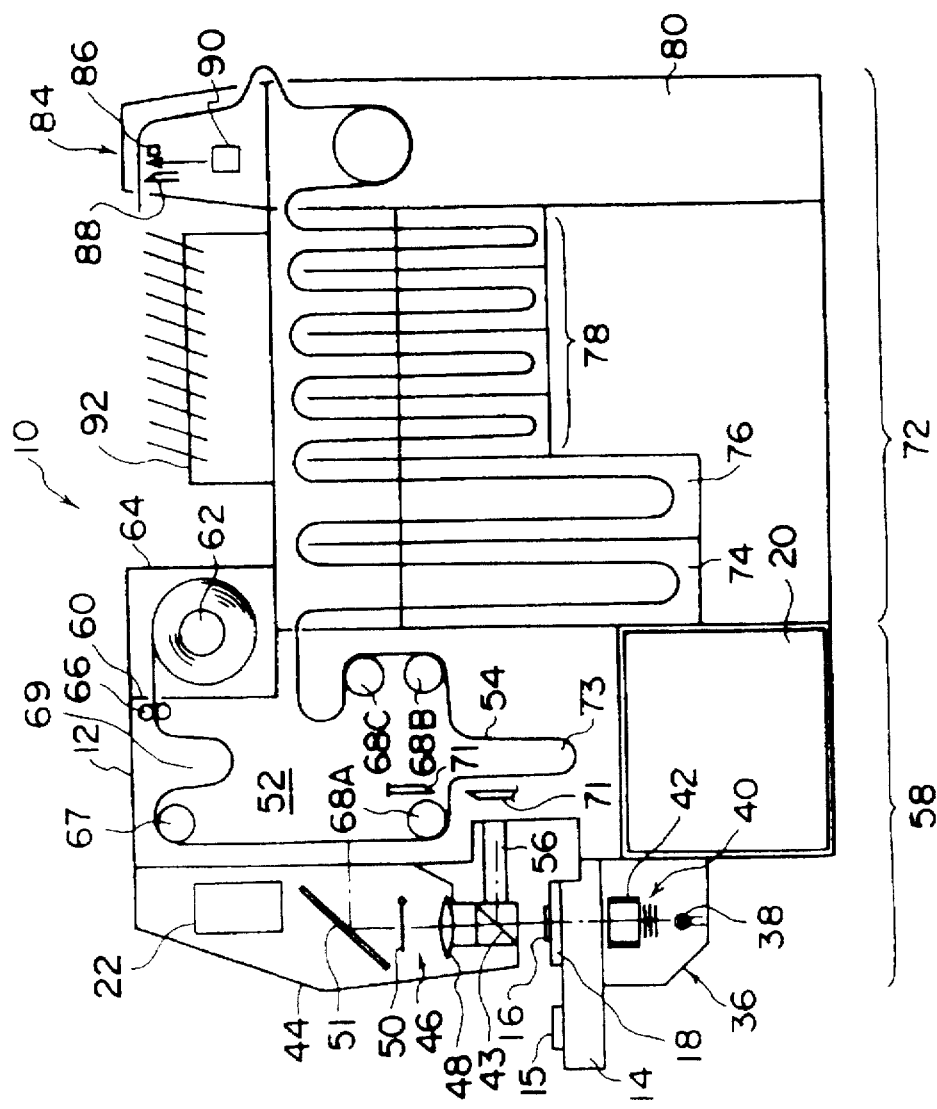
FIG. 1 is a schematic diagram showing a general configuration of a printer processor according to embodiments of the present invention.
Figure 2:
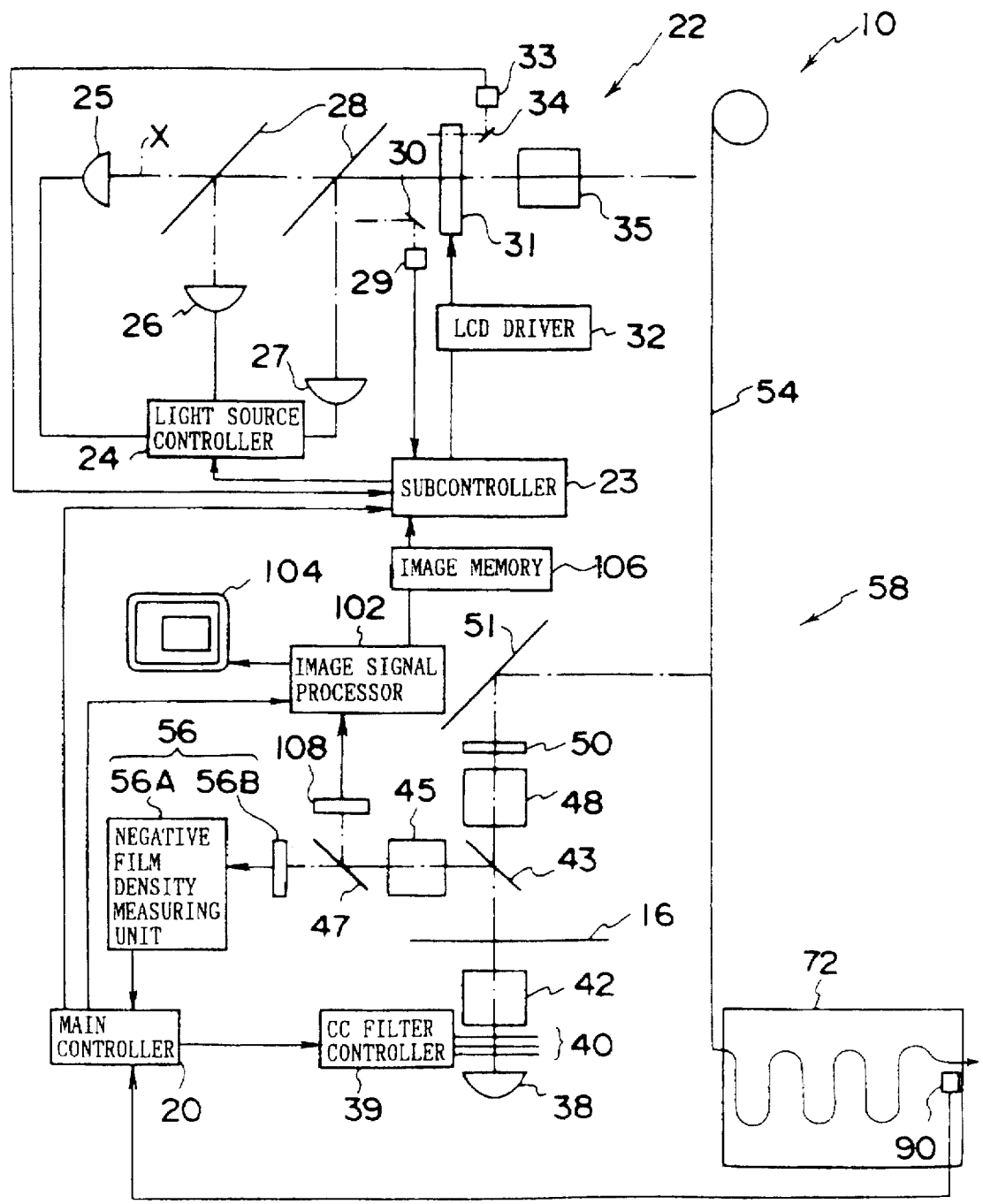
FIG. 2 is a block diagram showing a configuration of a printer unit according to the first embodiment.

Reference is made to FIGS. 1 and 2 showing a configuration of a printer processor 10 according to the embodiment. The printer processor 10 with the exterior thereof covered with a casing 12 includes a printer unit 58 for exposing the printing paper for main print and subprint and a processor unit 72 for processing the printing paper for development, fixing, washing and drying.

The configuration of the printer unit 58 will be explained. The printer processor 10 is equipped with a work table 14 projected leftward of the casing 12 in FIG. 1. A negative carrier 18 for setting a negative film 16 and a keyboard 15 allowing the operator to enter commands and data are arranged on the upper surface of the work table 14.

A main exposure light source unit 36 is installed under the work table 14. The main exposure light source unit 36 includes a light source 38. The light emitted from the light source 38 reaches the negative film 16 set on the negative carrier 18 through a color-correction filter (hereinafter referred to as the CC filter) 40 and a diffusion cylinder 42. The CC filter 40 is composed of three filters of C (cyan), M (magenta) and Y (yellow). Each filter is adapted to operate under the control of a CC filter controller 39 to emerge on or withdraw from the light axis of the light emitted from the light source 38.

An arm 44 is formed over the negative carrier 18 (upper part of FIG. 1). The arm 44 includes therein a main exposure optical system 46 and a subprint unit 22 for exposing a subprint such as an index print.

A half mirror 43 is arranged at the lowest part of the main exposure optical system 46 and is reached by the light transmitted through the negative film 16 set on the negative carrier 18. An exposure lens 48 for changing the magnification of the image exposed, a black shutter 50 for cutting off the exposure light and a mirror 51 for reflecting the exposure light in the substantially perpendicular direction are arranged along the direction of progress of the light transmitted through the half mirror 43. The exposure light reflected from the mirror 51 is irradiated on the printing paper 54 set in the exposure chamber 52 thereby to expose the printing paper 54.

On the other hand, a photometric lens 45 for changing the magnification of a photometric image and a half mirror 47 are arranged in that order along the direction of progress of the light reflected from the half mirror 43. A scanner 108 including an image sensor or the like is arranged along the direction in which the light is reflected from the half mirror 47. The scanner 108 is connected with an image signal processor 102 for performing a predetermined image processing on the image data of each frame of the negative film 16 read by the scanner 108.

The image signal processor 102 is connected with a simulator 104 as an image display unit for displaying a simulation image of a print prepared under the conditions set for each frame image of the negative film 16.

The image signal processor 102 is also connected with an image memory 106 for storing image data. The image signal processor 102 causes the image data of each frame of the negative film 16 read by the scanner 108 to be stored in the image memory 106.

A negative density measuring unit 56 for measuring the image density of each frame of the negative film 16 is arranged along the direction of progress of the light transmitted through the half mirror 47. The negative density measuring unit 56 includes a scanner 56B made up of an image sensor or the like and a negative density measuring unit 56A for measuring the image density of each frame of the negative film 16 read by the scanner 56B.

The subprint unit 22 includes exposure light sources for an index print consisting of a light-emitting diode 25 for emitting the blue light component (hereinafter referred to as the B-LED), a light-emitting diode 26 for emitting the red light component (hereinafter referred to as the R-LED) and a light-emitting diode 27 for emitting the green light component (hereinafter referred to as the G-LED). These light sources are operatively controlled by a light source controller 24. The B-LED 25 is arranged on the exposure light axis X. A pair of dichroic mirrors 28 are arranged along the direction of progress of the light emitted from the B-LED 25. The light axis of the red light emitted from the R-LED 26 and the light axis of the green light emitted from the (G-LED 27 are thus rendered to coincide with the exposure light axis X.

A mirror 30 is arranged at the end of the light path (a position not affecting the image) downstream of the dichroic mirrors 28 along the direction of progress of the light. A source light amount sensor 29 for measuring the amount of the light emitted from the light source is arranged along the direction in which the light is reflected from the mirror 30.

A liquid crystal panel 31 is arranged in a plane perpendicular to the exposure light axis X downstream of the mirror 30. A multiplicity of pixels capable of displaying the white, black and halftone colors by electrical means are arranged in a regular matrix on the image display surface of the liquid crystal panel 31. The liquid crystal panel 31 is also capable of expressing 256 tones. The liquid crystal panel 31 is connected with a liquid crystal panel driver 32 for driving the liquid crystal panel 31 for image display. The liquid crystal panel driver 32 in turn is connected with a subcontroller 23 for monitoring and controlling various processing conditions of the subprint unit 22.

The subcontroller 23 includes a CPU, a RAM, a ROM, an input/output controller and the like not shown, and is connected through the input/output controller to the image memory 106 described above. The subcontroller 23 reads out the image data of each frame of the negative film 16 stored in the image memory 106, forms a set of index image data with a plurality of frame images arranged according to a predetermined rule, and causes the liquid crystal panel driver 32 to display an image corresponding to the image data of five frames (one line), for example, on the liquid crystal panel 31. The subcontroller is also capable of displaying on the liquid crystal panel 31 the image data on only one of the color components of R, G, B among the image data included in one line.

A mirror 34 is arranged at the end of the light path (at a position not affecting the image) downstream of the liquid crystal panel 31. A transmitted light amount sensor 33 for measuring the amount of the light transmitted through the liquid crystal panel 31 is arranged along the direction of the light reflected from the mirror 34.

An exposure Lens 35 for changing the magnification of the image of the subprint to be exposed is arranged downstream of the mirror 34. The image of the index print displayed on the liquid crystal panel 31 and projected by the exposure light is focused at a predetermined magnification by the exposure lens 35 on the printing paper 54.

The subcontroller 23 is also connected with a light source controller 24, a source light amount sensor 29 and a transmitted light amount sensor 33. The subcontroller 23 calculates the proper correction light amount on the basis of the light amount value for each color of R, G, B measured by the source light amount sensor 29. The amount of the light emitted from the B-LED 25, R-LED 26 and G-LED 27 are thus corrected appropriately by the light source controller 24. In similar fashion, the subcontroller 23 has the function of adjusting the density of the image displayed on the liquid crystal panel 31 by controlling the liquid crystal panel driver 32 in such a manner as to attain a proper transmitted light amount on the basis of the transmitted light amount measured by the transmitted light amount sensor 33.

A main controller 20 similar to the subcontroller 23 is arranged under an exposure chamber 52 for controlling and monitoring the whole operation of the printer processor 10. This main controller 20 consists of a CPU, a RAM, a ROM, an input/output controller and the like not shown. The main controller 20 is connected with a CC filter controller 39, a negative density measuring unit 56A, an image signal processor 102 and the subcontroller 23 for controlling and monitoring the operation thereof.

A mounting unit 60 is provided at the corner between the upper right side of the arm 44 and the upper surface of the casing 12. A paper magazine 64 for taking up and accommodating the printing paper 54 in layers on a reel 62 is attached to the mounting unit 60.

A pair of rollers 66 is arranged in the vicinity of the mounting unit 60 for holding and transporting the printing paper 54 in horizontal direction to an exposure chamber 52. The printing paper 54 is hung on a roller 67 before the arm 44 and droops down by being changed by 90 degrees in direction. A first stock unit 69 for guiding along a substantially U-shaped path and stocking the printing paper is arranged between the roller 66 and the roller 67.

Rollers 68A, 68B, 68C are arranged under the exposure section of the exposure chamber 52. The printing paper 54 printed with the image of the negative film 16 in the exposure chamber 52 is changed in direction by about 90 degrees through each of the rollers 68A, 68B, 68C and transported to a processor unit 72 described later.

A cutter 71 is arranged downstream of the roller 68A for cutting off the rear end of the printing paper 54 at the end of the exposure process. The printing paper 54 cut off by the cutter 71 and remaining in the exposure chamber 52 can be wound back on the paper magazine 64 again. A second stock unit 73 is arranged between the roller 68A and the roller 68B for guiding along a substantially U-shaped path and keeping the exposed printing paper 54 in stock. The second stock unit 73 absorbs the difference in processing time between the printer unit 58 and the processor unit 72 by keeping the printing paper 54 in stock.

The structure of the processor unit 72 will be explained. The processor unit 72 includes a color development bath 74 for storing a color-developing solution, a bleaching-fixing bath 76 for storing a bleaching-fixing solution and a plurality of rinse baths 78 for storing a washing solution. The printing paper 54 is developed, fixed and washed as it is fed through the color-developing bath 74, the bleaching-fixing bath 76 and the rinse baths 78 sequentially. The washed printing paper 54 is transported to a drying unit 80 adjacent to the rinse baths 78. The drying unit 80 takes up the printing paper 54 on a roller and dries it by exposing to high-temperature air.

The printing paper 54 is held between a pair of rollers not shown, and after being completely dried, is discharged at a predetermined rate from the drying unit 80. A cutter unit 84 is arranged downstream of the drying unit 80. The cutter unit 84 includes a cut mark sensor 86 for detecting the cut mark attached to the printing paper 54, a paper density measuring unit 90 for measuring the density of the printing paper 54 and a cutter 88 for cutting off the printing paper 54.

The cut mark sensor 86, the paper density measuring unit 90 and the cutter 88 are connected to the main controller 20. The cutter unit 84 cuts the printing paper by the cutter 88 into image frames thereby to complete a photographic print.

Figure 5A:
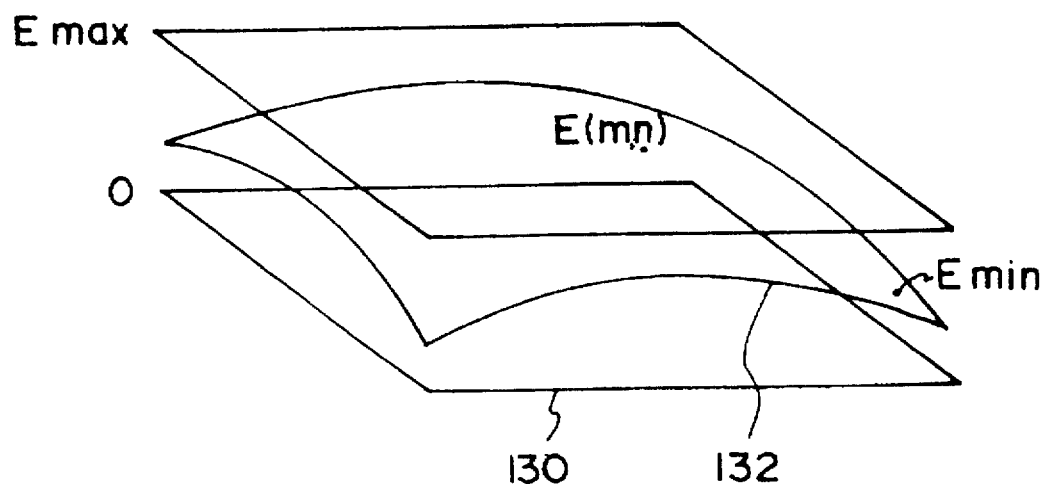
FIG. 5A is a diagram showing the distribution of exposure amount on a print surface.
Figure 5B:
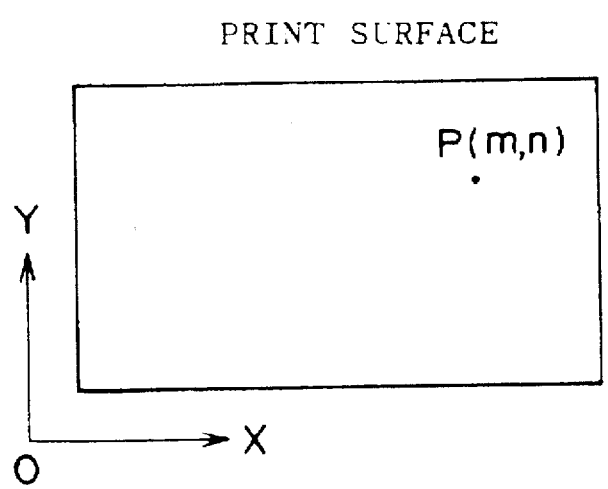
FIG. 5B is a diagram showing a coordinate setting on the print surface.

The paper density measuring unit 90 has the function of measuring the density at all the density measuring points defined in advance on the print surface corresponding to each pixel of the liquid crystal liquid panel 31 as shown in FIG. 5B. The density at a given density measuring point P(m,n) is assumed to be D(m,n).

The photographic print thus completed is discharged to a sorter unit 92 where it is sorted and checked in a predetermined fashion. Inferior prints such as out-of-focus prints are removed by this check process, while normal photographic prints are returned to the customer together with a negative film.

Now, the operation of the first embodiment will be described.

First, the exposure process of the main print at the printer unit 58 of the printer processor 10 will be described. With the black shutter 50 closed, the negative film 16 having recorded therein an image to be printed is set on the negative carrier 18 and the light source 38 is turned on. The density of the image of the negative film 16 focused by the light transmitted through the negative film 16 is measured at the negative film density measuring unit 56. According to the image density of the negative film 16 thus measured, the main controller 20 sets proper exposure conditions (such as the amount by which each filter of the filter unit 40 is to be inserted). The black shutter 50 is opened, so that the image of the negative film 16 is exposed on the printing paper 54 under the exposure conditions set above.

Explanation will be made about the case in which a frame image similar to the main print is exposed in the subprint unit 22 as an exposure process of the subprint at the printer unit 58. The negative film 16 having recorded therein an image to be printed is set on the negative carrier 18 and the light source 38 is turned on. The image of the negative film 16 focused by the light transmitted through the negative film 16 is read by the scanner 108. The image data thus read is stored in the image memory 106 by the image signal processor 102. The subcontroller 23 reads the image data from the image memory 106. An image corresponding to the blue image is displayed on the liquid crystal panel 31 in such a manner that the blue component of the image data (hereinafter referred to as the blue image) is focused on the printing paper 54. The B-LED 25 is then turned on for the length of time corresponding to the exposure conditions set above. As a result, the blue image of the image data is exposed on the printing paper 54. In similar fashion, the red component (red image) and the green component (green image) of the image data are displayed on the liquid crystal panel 31, and by turning on the R-LED 26 and the G-LED 27 respectively, the red image and the green image of the image data are exposed on the printing paper 54 respectively. Consequently, the image to be printed is exposed on the printing paper 54.

Now, the process at the processor unit 72 will be described. After an image to be printed is exposed on the printing paper 54, as described above, the printing paper 54 is transported through the color-developing bath 74, the bleaching-fixing bath 76 and the rinse baths 78 of the processor unit 72 sequentially, in which the printing paper 54 is developed, fixed and washed, respectively. The printing paper 54 thus washed is transported to the drying unit 80 and dried in a high-temperature air. The printing paper 54 thus dried is transported to the cutter unit 84 where it is cut by the cutter 88 into image frames as photographic prints. The photographic prints are discharged to the sorter unit 92 where they are sorted appropriately.

A method of shading correction at the subprint section 22 will be described as an operation relating to the invention. The shading correction according to the first embodiment is performed by correcting the driving voltage value for each pixel of the liquid crystal panel 31. The shading correction described below is executed at regular intervals of time (for example, once each week, once each month, etc.).

The shading correction according to the first embodiment includes a shading correction data calculation process for calculating the shading correction data and a printing process for correcting the shading using the shading correction data and printing an image. These processes will be described sequentially below.

Figure 3:
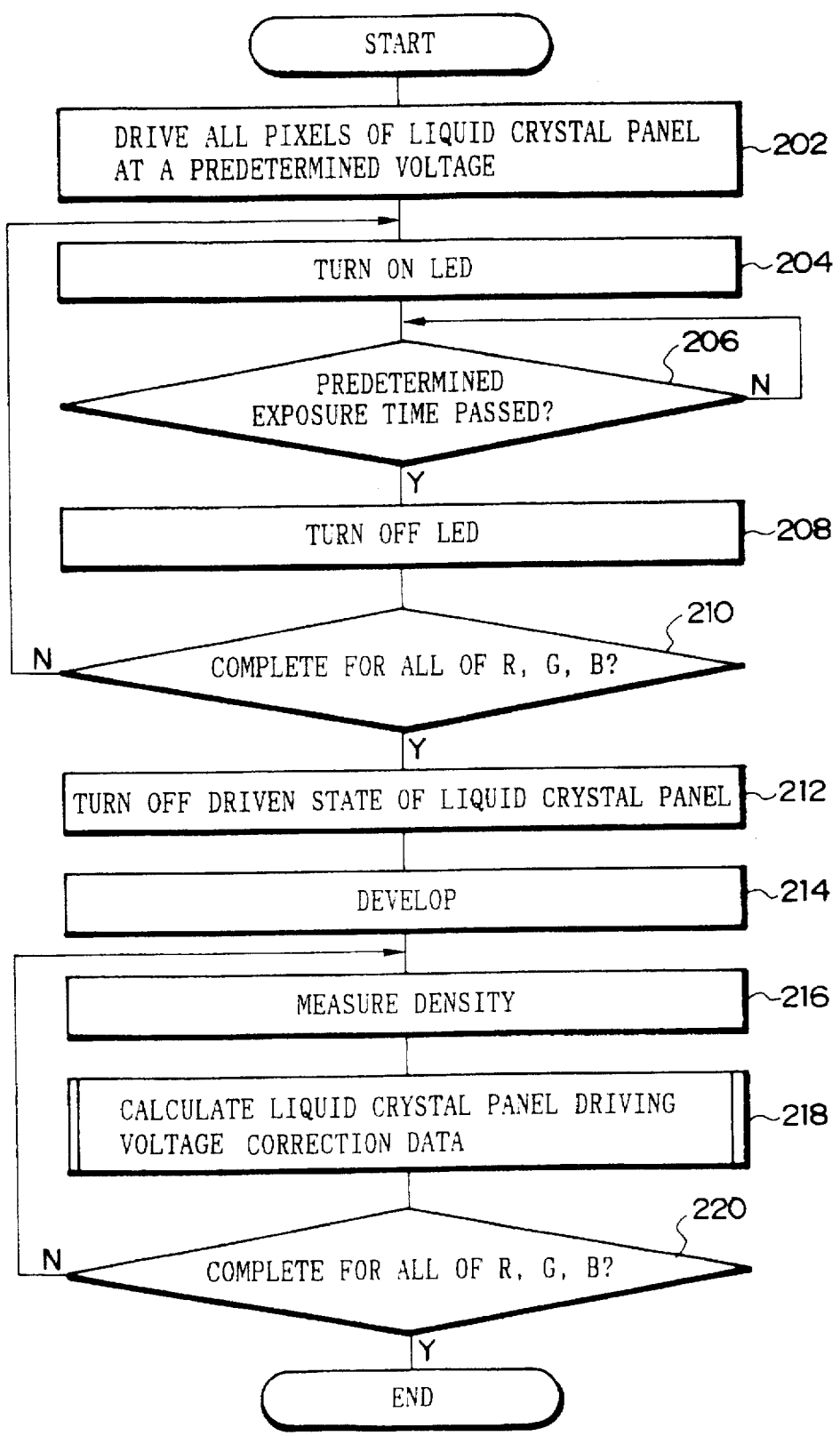
FIG. 3 is a flowchart showing a control routine for the shading correction data calculation according to the first embodiment.

When the operator issues a command to start the shading correction data calculation process by way of the keyboard 15, the subcontroller 23 begins to execute the control routine shown in FIG. 3.

In step 202 of FIG. 3, all the pixels of the liquid crystal panel 31 are driven at a predetermined constant voltage $V_0$. In the next steps 204, 206 and 208, one of the LED light sources including R-LED 26, G-LED 27 and B-LED 25 is turned on for a predetermined length of exposure time $t_0$ at a predetermined driving voltage. As a result, the light transmitted through the liquid crystal panel 31 from the LED light source reaches the printing paper 54, so that the printing paper 54 is exposed during the exposure time $t_0$. These steps 204 to 208 are executed for each of R-LED 26, G-LED 27 and B-LED 25. Upon complete execution of these steps, the process proceeds to step 212.

In step 212, the driven state of the liquid crystal panel 31 is canceled. In step 214, the processor unit 72 performs the processes of development, fixing, washing and drying on the exposed printing paper 54, thereby producing a photographic print.

All the pixels of the liquid crystal panel 31 are driven by the voltage $V_0$. Theoretically, therefore, all the pixels should have the same transmittance, and a uniform photographic print without any irregularities should be produced by the above-mentioned exposure process. Actually, however, print irregularities occur due to the light amount variations among the LEDs making up the LED light source and the light amount variations among the light rays transmitted through different points of the exposure lens 35. The distribution of exposure light amount for the liquid crystal pixels shown in FIG. 5A, for example, indicates that the exposure amount is high at the central portion and low at the peripheral portion of the print surface 130.

In the next step 216, the density of one of the color components R, G, B is measured at each density measuring point in the produced photographic print corresponding to each pixel of the liquid crystal panel 31. The next step 218 executes the subroutine for calculating the correction data of the liquid crystal panel driving voltage shown in FIG. 4.

Figure 4:
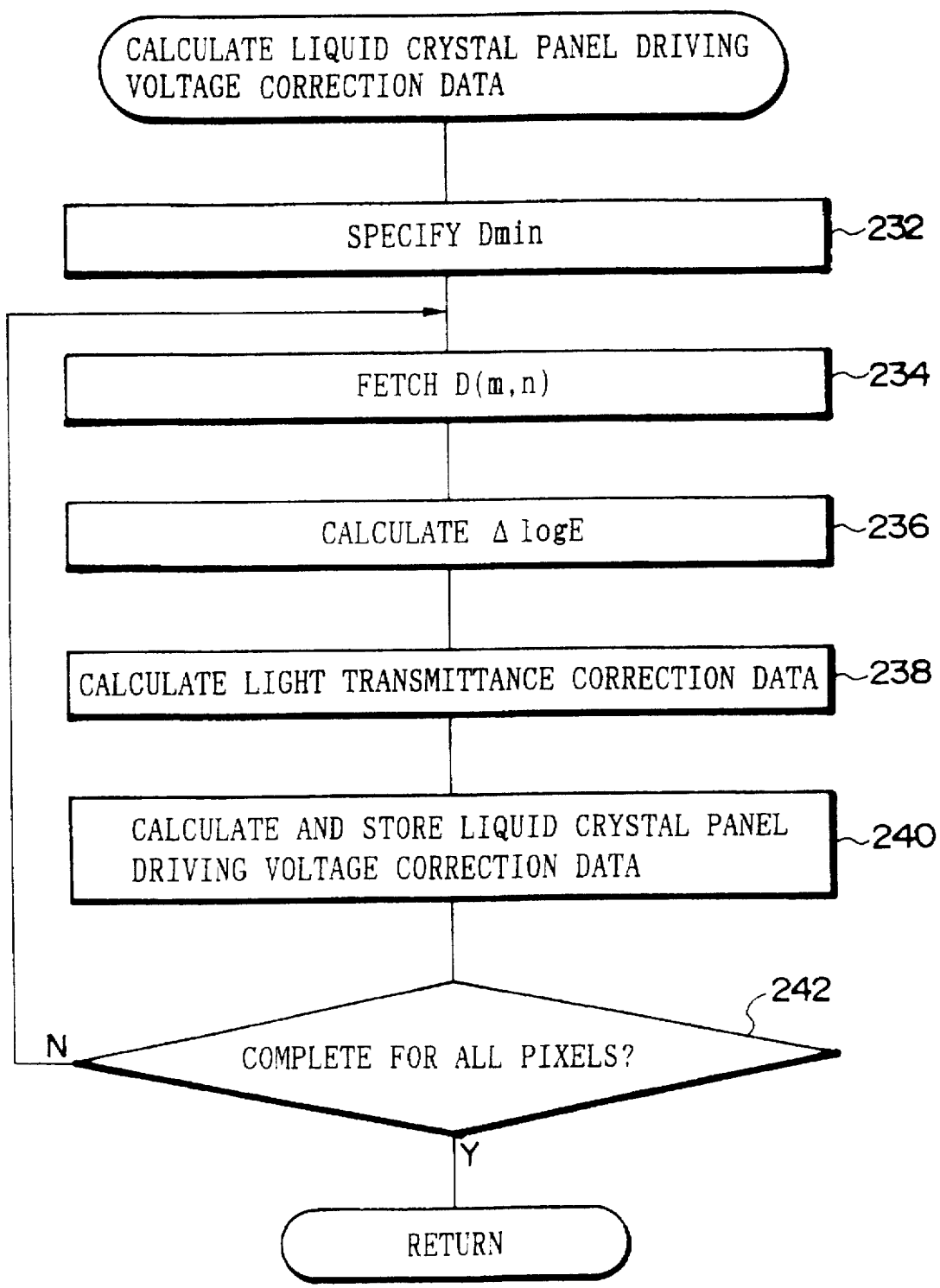
FIG. 4 is a flowchart showing a subroutine for the correction data calculation for a liquid crystal panel driving voltage.

In step 232 of FIG. 4, a minimum value $D_{min}$ is specified among the densities measured at the density measuring points in step 216. The density measuring point where the minimum value $D_{min}$ was obtained is assumed to be $P_{min}$. In the next step 234, the density $D(m,n)$ at a density measuring point $P(m,n)$ is fetched.

The next step 236 calculates a deviation $\Delta \log E(m,n)$ of $\log E(m,n)$ from a reference $\log E_{min}$, where $E_{min}$ is the exposure amount (=light amount×exposure time) at point $P_{min}$ and $E(m,n)$ is the exposure amount at point $P(m,n)$.

Figure 6A:
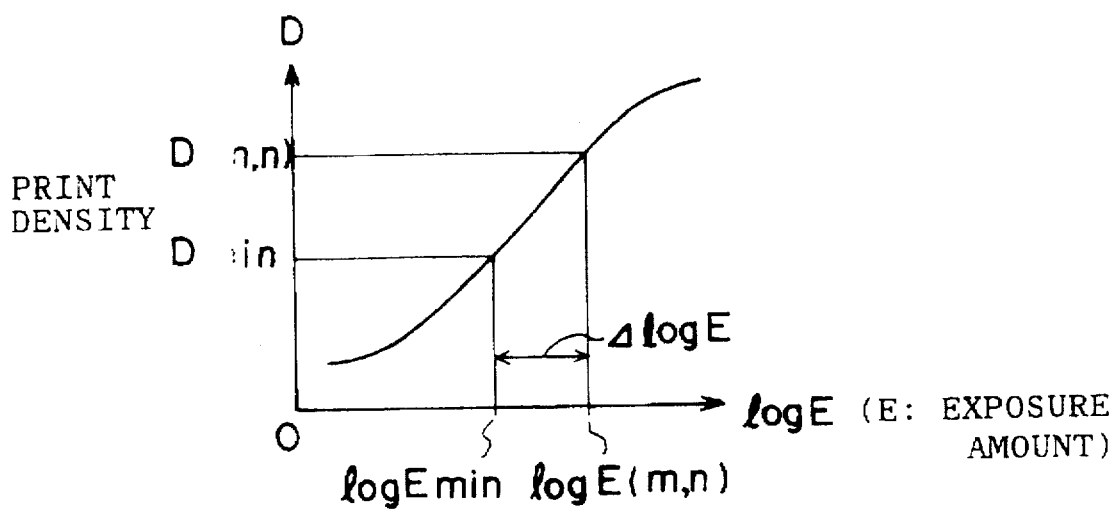
FIG. 6A is a diagram showing the characteristic of the exposure amount versus the print density.

As an example, let $D(m,n)$ be 1.3K, $D_{min}$ be 0.8K and the gradient $\gamma$ of the density value with respect to the exposure amount (the gradient of the curve of the print density versus the exposure amount shown in FIG. 6A) be 2.5K (K: predetermined constant). The value D is approximated as $\gamma \log E$. Therefore, $$\Delta \log E(m,n) = \log E(m,n) - \log E_{min} \quad (1)$$
$$= \{D(m,n) - D_{min}\}/\gamma$$
$$= 0.2$$

In other words, $$E(m,n)/E_{min} = 10^{0.2} = 1.58 \quad (2)$$

The exposure amount $E(m,n)$ at point $P(m,n)$ is found to be about 1.58 times as large as the exposure amount $E_{min}$ at point $P_{min}$.

In view of the fact that the exposure amount $E(m,n)$ is about 1.58 times as large as the exposure amount $E_{min}$ in the aforementioned example, the correction data for the light transmittance $T(m,n)$ is calculated in step 238 in such a manner that the light transmittance $T(m,n)$ at point $P(m,n)$ is about 1/1.58 times the light transmittance $T_{min}$ at point $P_{min}$.

Figure 6B:
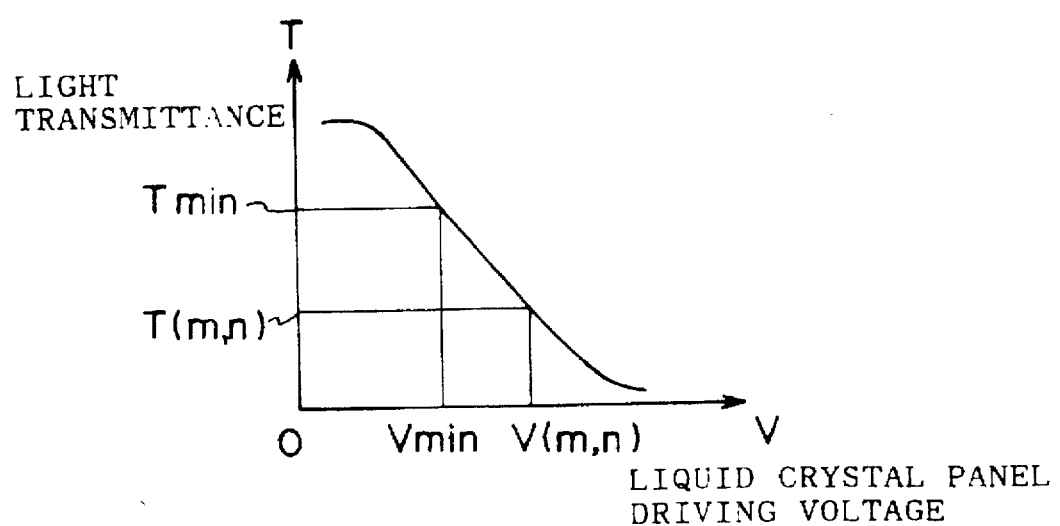
FIG. 6B is a diagram showing the characteristic of light transmittance versus the liquid crystal panel driving voltage.

The next step 240 determines a liquid crystal panel driving voltage $V(m,n)$ corresponding to the light transmittance $T(m,n)$ equivalent to 1/1.58 times the reference light transmittance $T_{min}$ and a liquid crystal panel driving voltage $V_{min}$ corresponding to the light transmittance $T_{min}$ on the curve of the light transmittance versus the liquid crystal panel driving voltage shown in FIG. 6B. The ratio $V(m,n)/V_{min}$ between these liquid crystal panel driving voltages is determined as correction data for the driving voltage to be applied to the pixel of the liquid crystal panel 31 corresponding to point $P(m,n)$. Further, the correction data are stored in the RAM of the subcontroller 23.

Steps 234 to 240 are executed for the density measuring points corresponding to all the pixels of the liquid crystal panel 31, and upon complete execution of the same steps, the process returns to the main routine.

Subsequently, as shown in FIG. 3, the density measurement of step 216 and the subroutine of correction data calculation for the liquid crystal panel driving voltage of step 218 are executed for each of the color components R, G, B.

The shading correction data calculation process described above determines the correction data for the driving voltage to be applied to each pixel of the liquid crystal panel 31 for each of the color components R, G, B, which correction data are stored in the RAM of the subcontroller 23.

Now, the printing process shown in FIG. 8 will be explained. Assume that the operator designates image data to be printed by way of the keyboard 15 thereby to issue a command to start the printing process. The control routine shown in FIG. 8 starts to be executed by the subcontroller 23.

Figure 8:
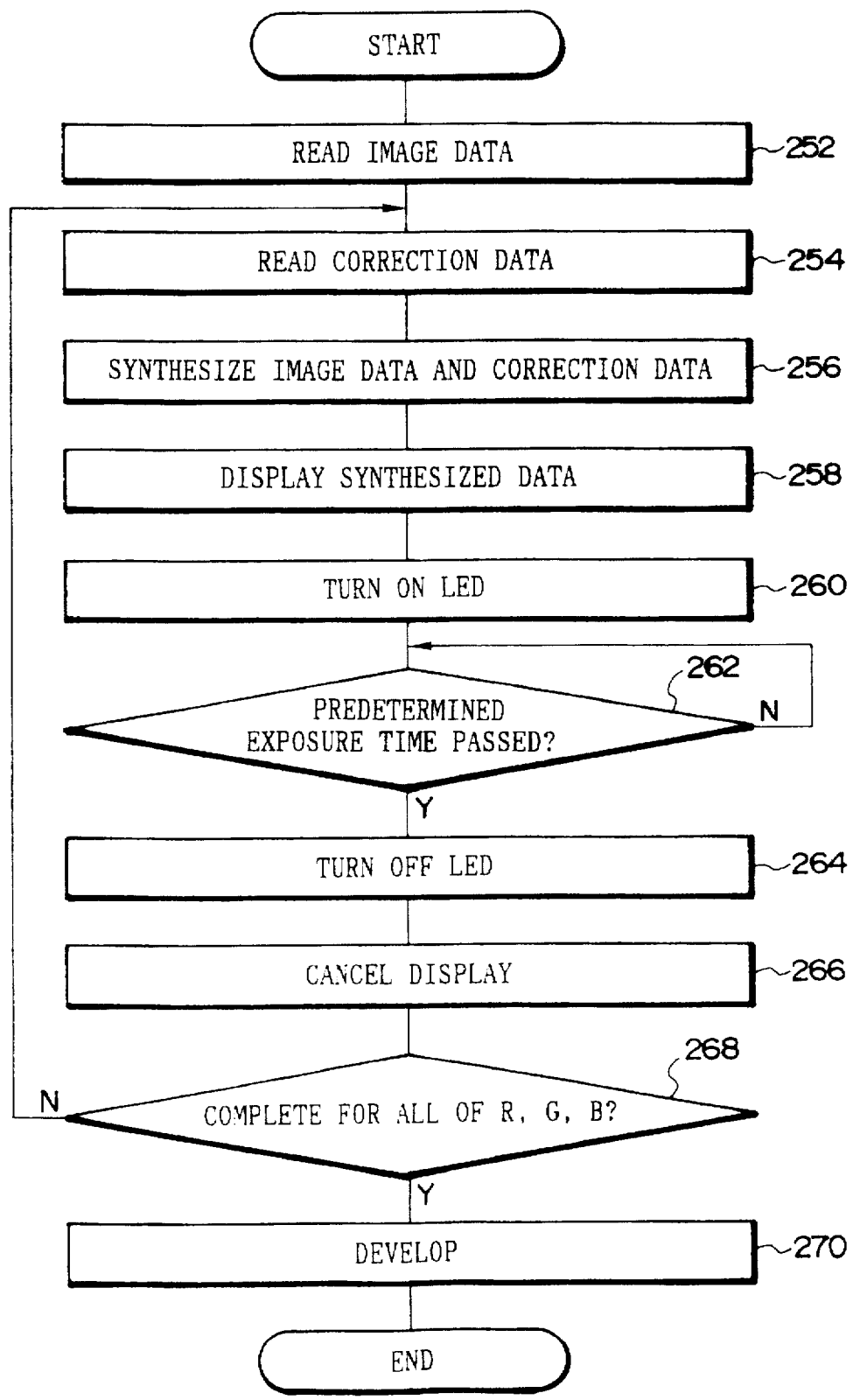
FIG. 8 is a flowchart showing a control routine for the printing process according to the first embodiment.

In step 252 shown in FIG. 8, the image data to be printed are read out of the image memory 106. In the next step 254, the correction data of the driving voltage to be applied to each pixel of the liquid crystal panel 31 are read from the RAM of the subcontroller 23 for each color component of R, G, B. The next step 256 synthesizes the image data and the correction data for each pixel of the liquid crystal panel 31. More specifically, the driving voltage for displaying the image data at each pixel is multiplied by the correction data, thereby calculating the driving voltage $V_L$ corrected. In the next step 258, each pixel is driven by the corrected driving voltage $V_L$ thereby to display the image data. The image data thus displayed will be called the corrected image data as they are displayed by the pixels driven by the corrected driving voltage $V_L$.

In the next steps 260 to 264, the LED light source corresponding to the same color component as the corrected image data is turned on for a predetermined exposure time $t_0$ by a predetermined driving voltage. The corrected image data displayed in step 258 thus is exposed on the printing paper 54. In the next step 266, the display on the liquid crystal panel 31 is canceled.

Steps 254 to 266 are executed for each color component of R, G, B, and upon complete execution, the process is passed to step 270.

In step 270, the processor unit 72 performs the processes of development, fixing, washing and drying on the printing paper 54 thereby to produce a photographic print.

The image data exposed by the above-mentioned printing process, i.e., the corrected image data displayed on the liquid crystal panel 31 in step 258 are already corrected in shading by the driving voltage correction data calculated by the above-mentioned shading correction data calculation process. Therefore, print irregularities, which otherwise might occur due to the variations in the light amount of LEDs constituting the LED light source or the variations in the light amount transmitted through the exposure lens 35, do not occur in the photographic print produced in step 270.

The effects of the first embodiment described above will be explained in comparison with the prior art with reference to FIGS. 7A to 7J. FIGS. 7A, 7C, 7E, 7G and 7I are diagrams schematically showing the distributions of the light amount from a light source (LED), the light transmittance of a liquid crystal panel, the light amount transmitted through an optical system device, the exposure light amount for the printing paper to be exposed and the print density of a photographic print produced from the same printing paper, respectively, as obtained in a light path plane, according to the first embodiment, passing through, for example, the center line parallel to the long side of the rectangular image display screen of the liquid crystal panel 31 passing through the center of the same image display screen. FIGS. 7B, 7D, 7F, 7H and 7J, on the other hand, are diagrams schematically showing the distributions of the light amount from a light source (LED), the light transmittance of a liquid crystal panel, the light amount passed through an optical system device, the exposure light amount for the printing paper to be exposed and the print density of a photographic print produced from the same printing paper, respectively, as obtained in a light path plane passing, for example, through the center line parallel to the long side of the rectangular image display screen of the liquid crystal panel of a conventional liquid crystal photographic printer passing through the center of the same image display screen.

Figure 7A:
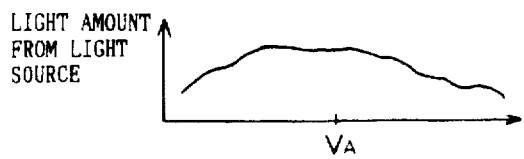
FIGS. 7A and 7B are diagrams showing the distribution of the light amount emitted from an LED light source.
Figure 7B:
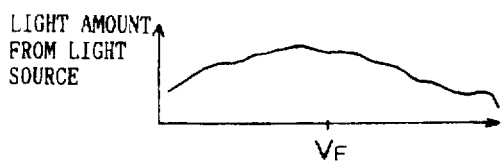
Figure 7C:
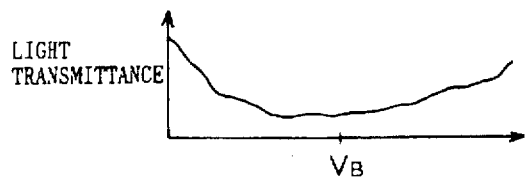
FIG. 7C is a diagram showing the distribution of light transmittance of the liquid crystal panel after correction.
Figure 7D:
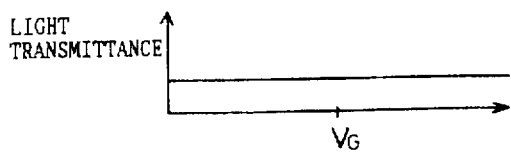
FIG. 7D is a diagram showing the distribution of light transmittance of the liquid crystal panel before correction.
Figure 7E:
FIGS. 7E and 7F are diagrams showing the distribution of the light amount transmitted through an optical system such as an exposure lens.
Figure 7F:
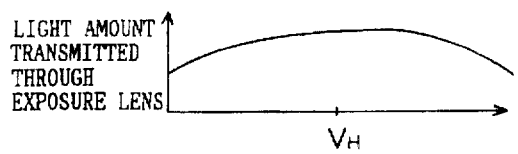
Figure 7G:
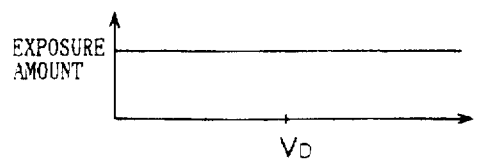
FIG. 7G is a diagram showing the distribution of the exposure light amount after correction.
Figure 7H:
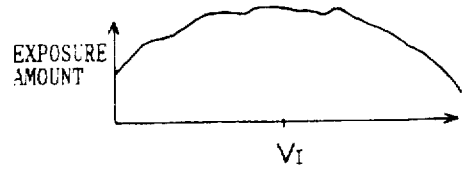
FIG. 7H is a diagram showing the distribution of the exposure light amount before correction.
Figure 7I:
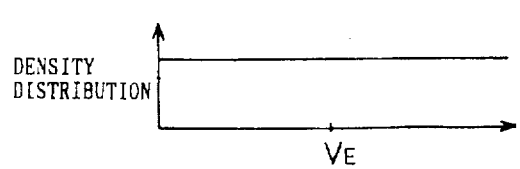
FIG. 7I is a diagram showing the density distribution of a photographic print after correction.
Figure 7J:
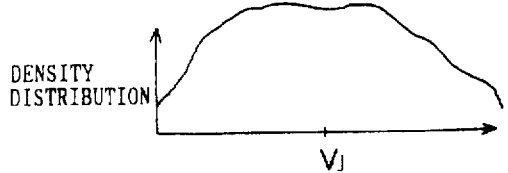
FIG. 7J is a diagram showing the density distribution of a photographic print before correction.

The conventional photographic printers develop light amount variations among the LEDs constituting an LED light source (FIG. 7B) and variations of the light amount among different points at which it is transmitted through the exposure lens 35 (FIG. 7F). Since the exposure process is performed with a uniform light transmittance as shown in FIG. 7D under this condition, the exposure amount is high at the center and low at the peripheral portion as shown in FIG. 7H. As a result, the density of a photographic print produced by exposure, as shown in FIG. 7J, is high at the central portion and low at the peripheral portion, resulting in print irregularities.

According to the first embodiment of the invention, by contrast, the light amount irregularities due to the light amount variations among the LEDs constituting an LED light source (FIG. 7A) and the light amount variations among different points of the exposure lens 35 (FIG. 7E) through which the light is transmitted are corrected by the light transmittance correction amount shown in FIG. 7C (the light transmittance correction amount set in such a manner that the density of all the pixels conforms with the minimum measured density $D_{min}$). In this way, a uniform light amount distribution as shown in FIG. 7G, and hence, a uniform print density distribution as shown in FIG. 7I, are obtained. Consequently, the print irregularities can be prevented.

Also, according to the first embodiment, the paper density measuring unit 90 preinstalled in the printer processor 10 measures the density at each measuring point corresponding to each pixel of the liquid crystal panel 31, and the resulting density measurement is utilized as information on an irregularities pattern for shading correction. In this way, a line sensor or the like device is not required for obtaining information on the irregularities pattern, but the shading correction can be easily accomplished by an ordinary printer processor. The equipment configuration for shading correction can thus be simplified.

According to the first embodiment, as described above, the shading correction is performed in such a manner that the density values at all the density measuring points in a photographic print conform with a minimum value $D_{min}$ providing a density measurement reference. The shading correction method according to this invention, however, is not limited to using the minimum density measurement $D_{min}$ as a reference, but the maximum value, average value or the intermediate value between maximum and minimum of the density measurement may alternatively be used as a reference.

[Second embodiment]

A second embodiment will be described. The second embodiment refers to the case in which the process of printing an image and the process of calculating the shading correction data are performed at the same time. The second embodiment is configured substantially the same way as the first embodiment described above. The same component parts in the second embodiment are designated by the same reference numerals as the corresponding parts of the first embodiment and will not be described any further.

Figure 9:
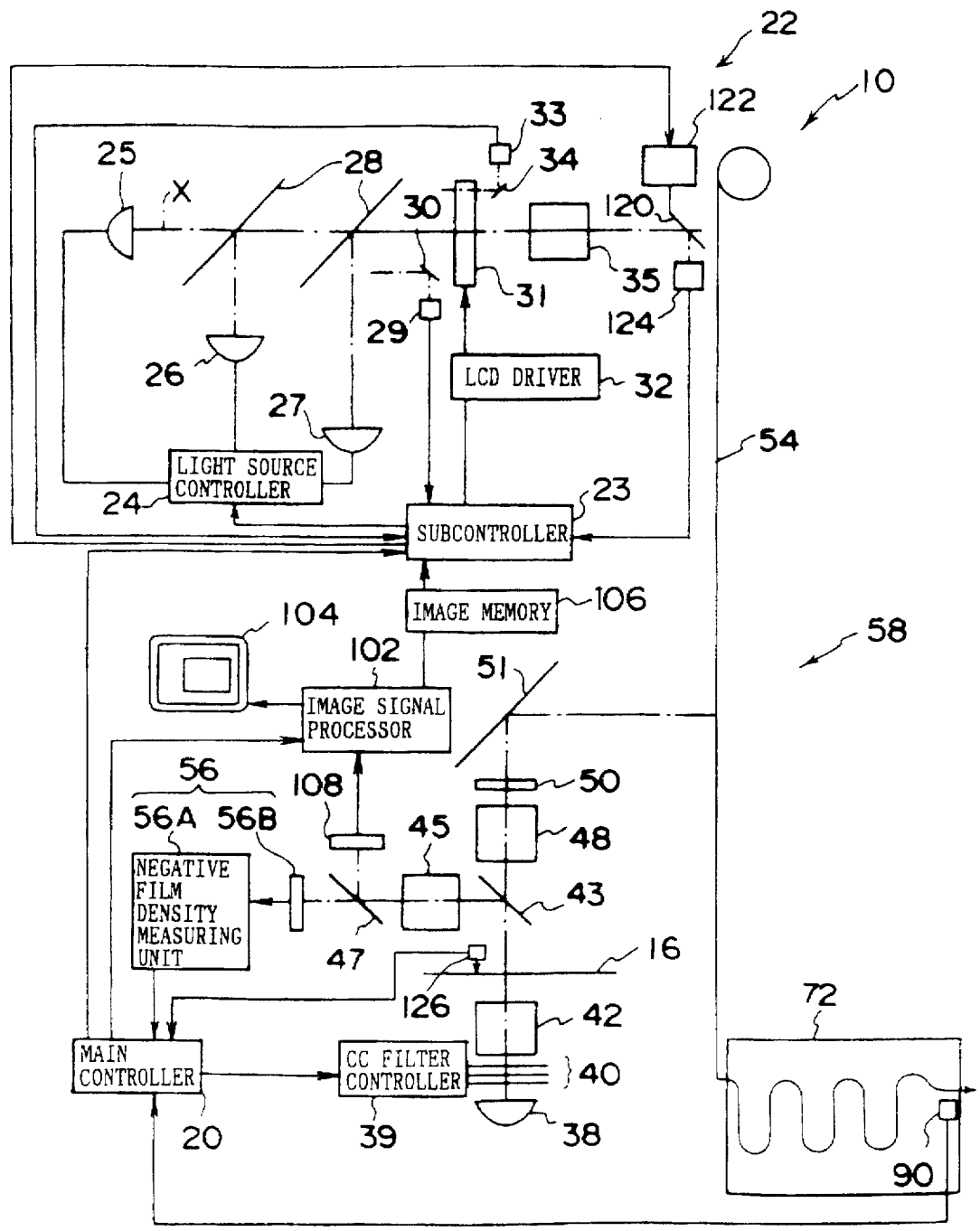
FIG. 9 is a block diagram showing a configuration of a printer unit according to a second embodiment.

As shown in FIG. 9, a subprint unit 22 includes a mirror 120 arranged downstream of an exposure lens 35 (right side in FIG. 9) along an exposure light axis X and adapted to emerge on the light path. The mirror 120 is connected with a mirror driver 122 For driving the mirror 120 into or withdraw it from the light path. The mirror driver 122 is connected with a subcontroller 23 for causing the mirror 120 to emerge on or withdraw from the light path in compliance with a command from the subcontroller 23.

A scanner 124 configured of a CCD or the like is arranged along the direction in which the exposure light is reflected from the mirror 120 in the case where the mirror 120 emerges on the light path. An image formed by the light transmitted through a liquid crystal panel 31 is focused on the image read surface of the scanner 124. The scanner 124 thus reads the irregularities pattern formed by the light transmitted through the liquid crystal panel 31 so that the density at each measuring point corresponding to each pixel of the liquid crystal panel 31 is measured.

Now, the operation of the second embodiment will be explained.

The exposure of a main print at the printer unit 58 of the printer processor 10, the exposure of a subprint at the printer unit 58 and the process at the processor unit 72 are identical to the corresponding processes, respectively, in the first embodiment, and therefore will not be described.

Figure 10:
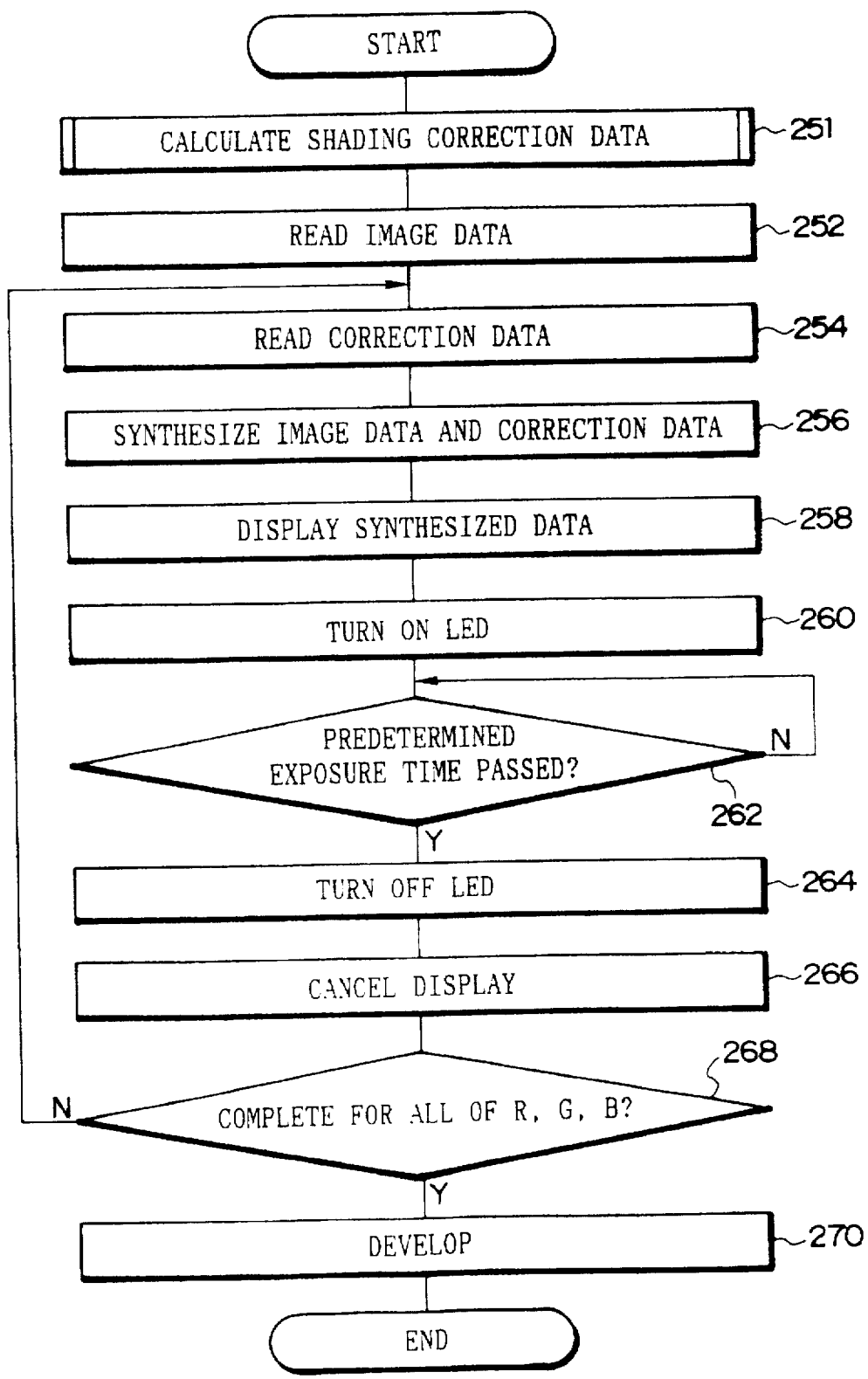
FIG. 10 is a flowchart showing a control routine for the printing process according to the second embodiment.

The operation of the second embodiment of the present invention will be described with reference to FIGS. 10 and 11 placing main emphasis on the difference thereof with the first embodiment described above.

According to the second embodiment, the printing process and the calculation of the shading correction data are performed at a time. In the first step 251 of the printing process shown in FIG. 10, the shading correction data are calculated (the subroutine of FIG. 11). Subsequent steps of the printing process are the same as those for the printing process of the first embodiment.

The shading correction data calculation process at step 251 of FIG. 10 will be explained with reference to FIG. 11.

Figure 11:
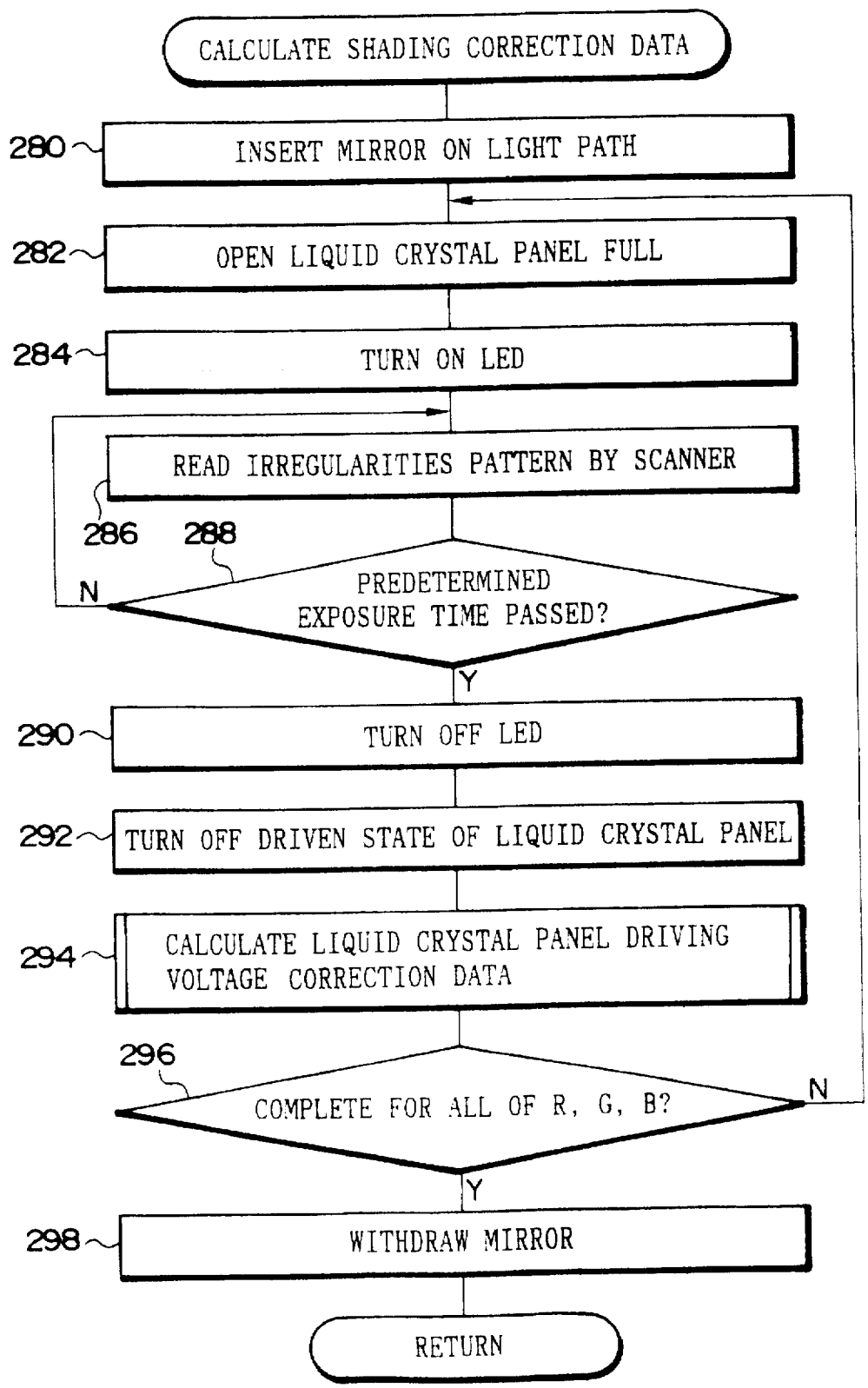
FIG. 11 is a flowchart showing a subroutine for calculating the shading correction data according to the second embodiment.

In step 280 of FIG. 11, the mirror 120 is inserted on the light path by the mirror driver 122. In the next step 282, all the pixels of the liquid crystal panel 31 are placed into a completely opened condition. In the next step 284, an LED light source for one of the color components R, G, B is turned on. Since the liquid crystal panel 31 is full open, all the parallel components of the light from the LED light source are passed through the exposure lens 35, and after being reflected from the mirror 120, reach the read surface of the scanner 124.

In the next step 286, the image formed by the light from the LED light source is read by the scanner 124. This read operation is continued for a predetermined length of exposure time in step 288. After the lapse of the predetermined exposure time, the LED light source is turned off in step 290. The next step 292 cancels the display on the liquid crystal panel 31, and the process proceeds to step 294 for executing the subroutine (FIG. 4) for calculating the correction data for the liquid crystal panel drive voltage in the same manner as in the first embodiment. As a result, the correction data on the liquid crystal panel driving voltage for one of the color components R, G, B is calculated.

After that, the process of steps 282 to 294 is executed for each color of R, G, B, thereby calculating the correction data for the liquid crystal panel driving voltage for each color R, G, B. After the mirror 120 is caused to withdraw from the light path in step 298, the process returns to the main routine of FIG. 10.

As described above, the simultaneous execution of the printing process and the shading correction data calculation process can determine the light transmittance correction amount for each pixel of the liquid crystal at the same temperature and under the same secular variations as for the exposure process. The shading correction can thus be accomplished with high accuracy in a manner meeting the temperature conditions and the secular variations experienced in the exposure process. Especially, it is possible to effectively avoid the reduction in correction accuracy which otherwise might be caused by a change in the irregularities pattern due to possible temperature changes or secular variations. The simultaneous execution of the printing process and the shading correction data calculation process according to the second embodiment, however, is not required more often than the shading correction error due to the irregularities pattern changes exceeds a tolerance (once a week or several times a month, for instance).

Figure 12:
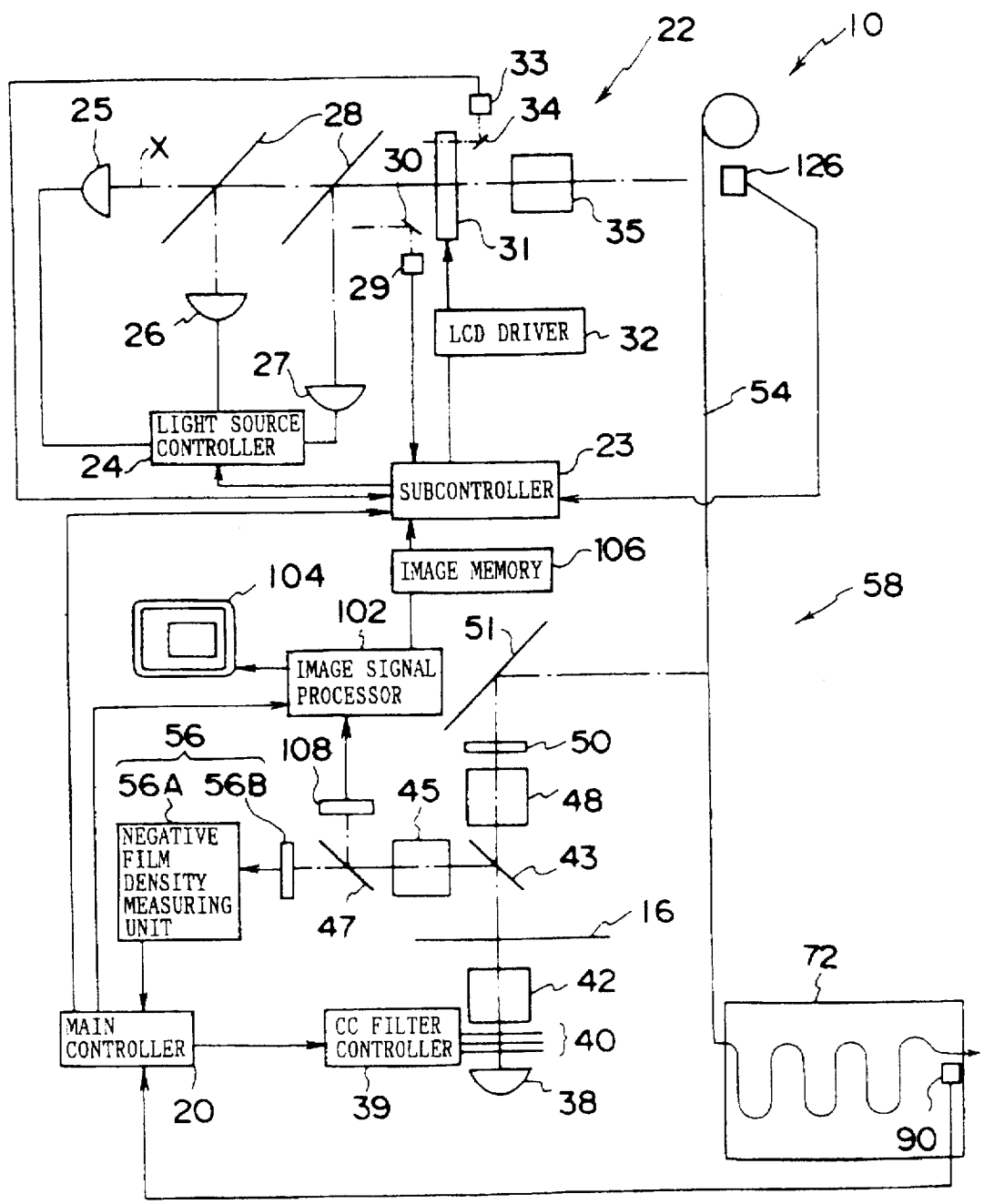
FIG. 12 is a block diagram showing a modification of the configuration of the printer unit according to the second embodiment.

The scanner for reading the irregularities pattern is not limited to the position shown in FIG. 9. Instead, the scanner 126 may be arranged on the exposure light axis X as shown in FIG. 12 so that the image formed by the light transmitted through the liquid crystal panel 31 may be read directly by the scanner 126 without being reflected from a mirror. The scanner may be disposed at any position on the exposure light axis X. It can be arranged, for example, either on this side (left side in the diagram) of or behind (right side in the diagram) the transport path of the printing paper 54 along the direction in which light progresses. In the case where the scanner 126 is arranged behind the transport path of the printing paper 54, however, the image formed by the light transmitted through the liquid crystal panel 31 is read by the scanner 126 only after the printing paper 54 is rolled back.

Although the first and second embodiments described above refer to the case in which the invention is applied to a printer processor including a subprint unit, the present invention can equally be applied to a photographic print system comprising an index printer and a paper processor independent of each other, or a digital photographic printer comprising an image memory, a two-dimensional display unit for displaying the image data stored in the image memory and an exposure system adapted to expose the image displayed on the two-dimensional display unit.

Also, apart from the liquid crystal panel used as a two-dimensional display unit in the first and second embodiments, the present invention may be embodied with any of the two-dimensional display units listed in Table 1 below other than the liquid crystal panel.

TABLE 1

| | Acronym | Definition |
|---|---|---|
| Photo-detection type | LCD | Liquid Crystal Display (embodiments) |
| | ECD | Electrochemical Display |
| | EPID | Electrophoretic Image Display |
| | SPD | Suspended Particle Display |
| | TBD | Twisting Ball Display |
| | PLZT | Transparent Ceramics Display |
| | DMD | Digital Micromirror Device |

According to the first and second embodiments described above, with respect to the image formed by the light transmitted through or reflected from a two-dimensional display unit, the density of each pixel (specifically, the light transmittance or light reflectance of each pixel of the two-dimensional display unit corresponding to each image point, or the driving voltage for each pixel of the two-dimensional display unit) is corrected in such a manner that the density of a point in the image corresponding to each pixel of the two-dimensional display unit agrees with a predetermined reference density. The resulting effect is that the light amount irregularities of the transmitted light or the reflected light caused by the light amount variations among the LEDs making up an LED light source and the variations of the transmitted or reflected light amount at different points in an optical system device can be corrected thereby to prevent print irregularities.

Especially, according to the fourth aspect of the invention, the shading correction can be easily accomplished by use of the exposure system devices of a two-dimensional display unit. In other words, another advantage is that the shading can be corrected easily without any photometric device or the like.

[Third embodiment]

A third embodiment of the invention will be described with reference to FIG. 9 and FIGS. 13 to 21. The configuration for realizing the operation of the third embodiment is substantially similar to that of the second embodiment described above. Therefore, the same components as those in the second embodiment will be designated by the same reference numerals respectively and will not be described any further.

Figure 14:
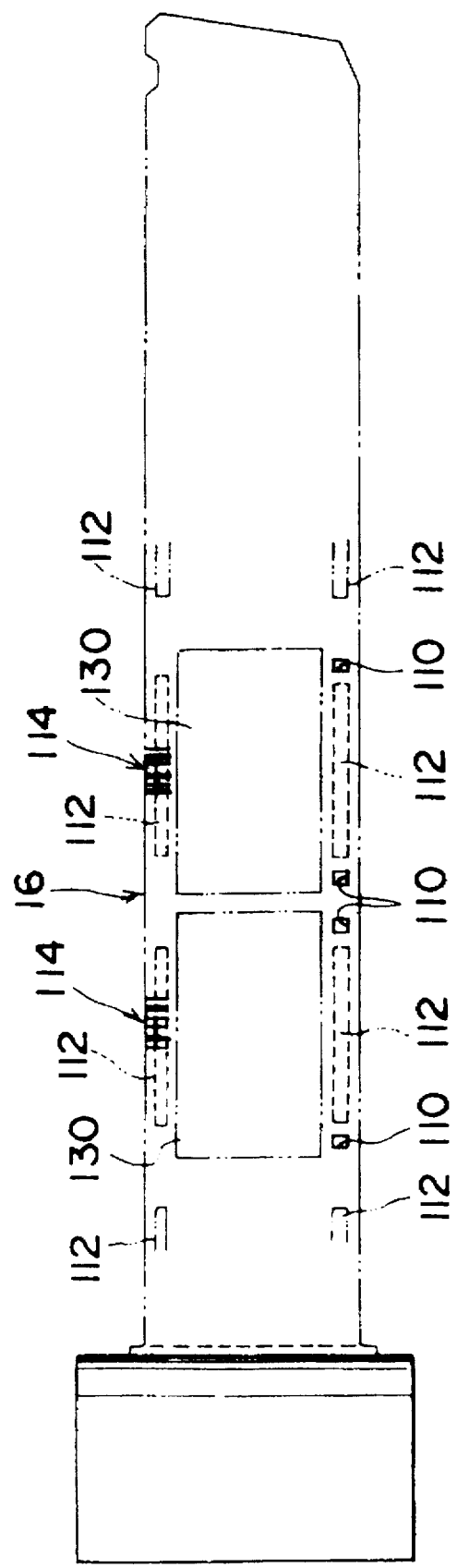
FIG. 14 is a diagram showing a configuration of a negative film according to a third embodiment.

According to this embodiment, a negative film 16 having recorded therein a frame image for producing an index print includes a plurality of image frames 130 arranged longitudinally in predetermined spaced relationship with each other as shown in FIG. 14. The negative film 16 has a perforation 110 formed in registry with each image frame 130 at a predetermined end along the width thereof. This perforation 110 makes it possible to discriminate the front and back of the negative film 16 and the position of each image frame 130.

A magnetic track 112 corresponding to each image frame 130 is formed on both sides along the width of the negative film 16. The magnetic track 112 has recorded therein various information on the process of picking up the images recorded in each image frame 130, the print size and the exposure conditions. The magnetic track portion 112 formed at the other end of the negative film 16 opposed to the perforation 110 has recorded therein information such as camera position for imaging and the date of imaging. The negative film 16 can be identified by a bar code 114 indicating the DX code recorded at an end thereof opposed to the perforation 110.

A reader 126 (FIG. 9) for the negative film 16 of this structure is arranged in the vicinity of the negative carrier 18 in order to read the information recorded in the magnetic track 112. The information read by this reader 126 is transmitted to a main controller 20.

A shading correction method for producing an index print by the subprint unit 22 will be explained as an operation according to the present invention.

First, the process of inputting image data to be recorded in each frame of an index print will be explained with reference to FIG. 13.

Figure 13:
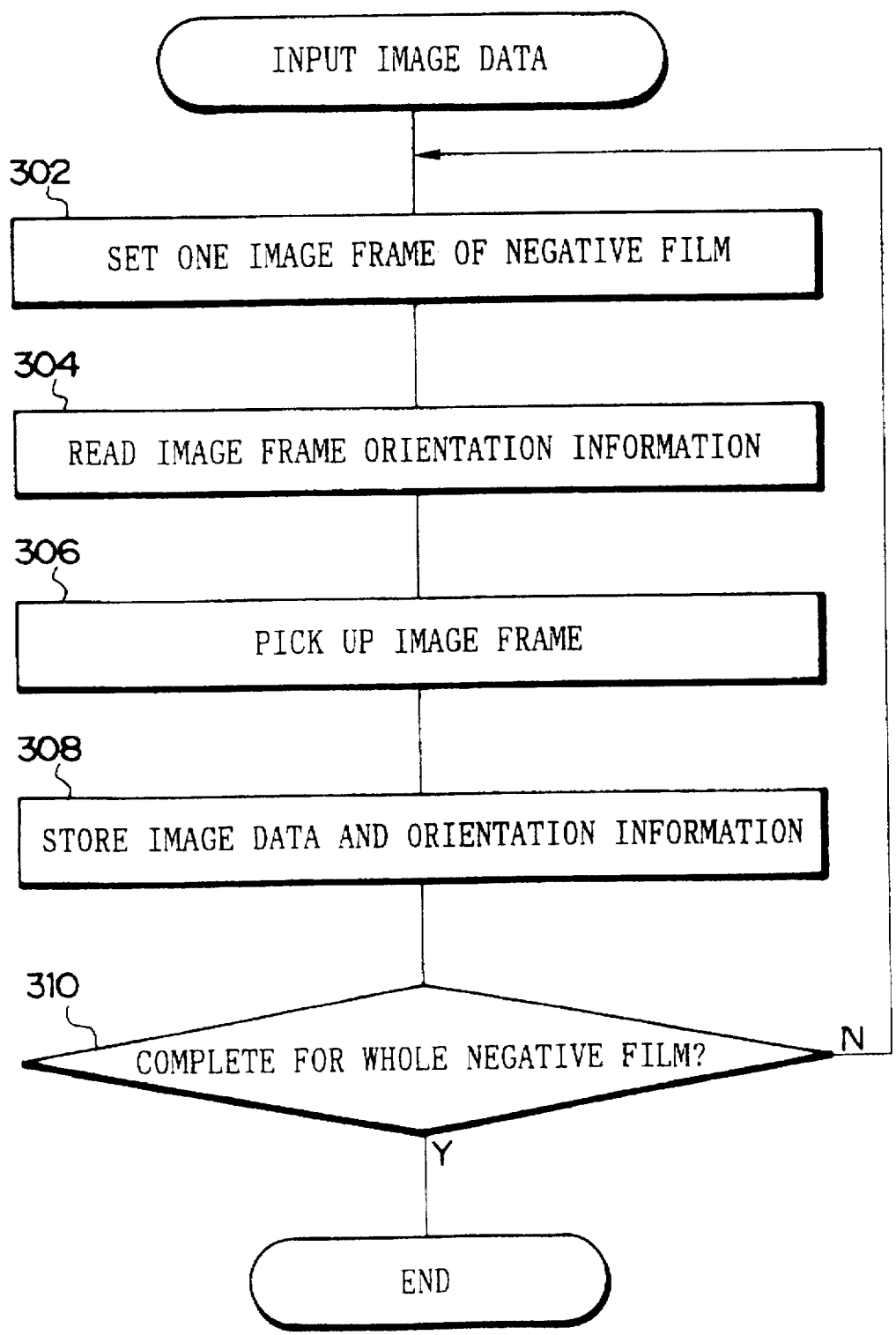
FIG. 13 is a flowchart showing a control routine for the image data input process.

When the operator issues a command to start the process of inputting image data by way of a keyboard 15, the main controller 20 starts executing the control routine shown in FIG. 13.

In step 302 of FIG. 13, the first single image frame of the negative film 16 is set at a predetermined printing position of the negative carrier 18. In the next step 304, the position information of the image frame thus set is read by the reader 126 from the magnetic track 112 corresponding to the particular image frame.

Figure 15A:
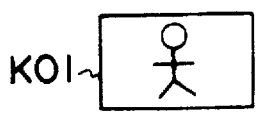
FIGS. 15A and 15B are diagrams showing a frame image in a reference orientation.
Figure 15B:
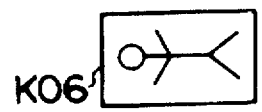

In the present embodiment, the image frame orientation shown in FIG. 15A imaged at a normal camera position without inclination is assumed to be a reference orientation A, and the image frame orientation shown in FIG. 15B imaged by a camera rotated 90 degrees counterclockwise toward the object is assumed to be a reference orientation B. The reference orientations A and B are considered to provide references for each frame image of the index print, and in the process of shading correction and production of the index print described later (FIG. 19), the orientation of all the frame images is determined in conformance with reference orientation A or B.

In the next step 306, the image recorded in the image frames set as above is picked up. The frame image is picked up by the scanner 108, and processed in a predetermined way by an image signal processor 102. In the next step 308, the image signal processor 102 stores the image data and the orientation information thus processed in the image memory 106.

Steps 302 to 308 described above are executed for each image frame of the whole sheet of negative film. By the time these seeps are completely executed on all the image frames of a negative film, therefore, the image data and the orientation information for each image frame of the whole negative film are stored in the image memory 106. In this way, the image data and the orientation information for each image frame of a negative film are input in the print processor 10 as a preprocess for index print production.

Now, the process of producing an index print will be described with reference to FIGS. 16 to 21.

Figure 16:
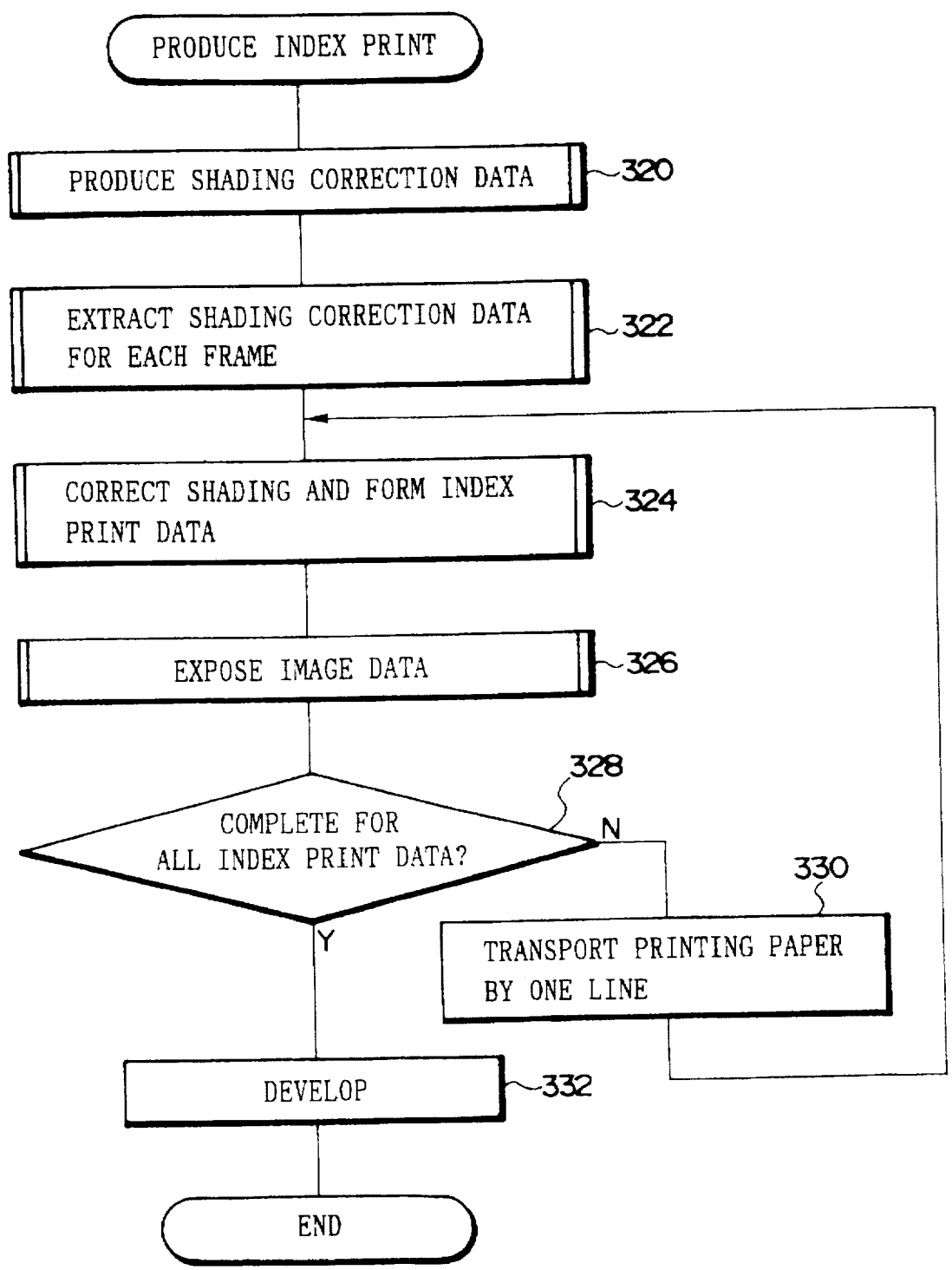
FIG. 16 is a flowchart showing a control routine for producing an index print.

When the operator issues a command to start the index print production process by way of the keyboard 15, the subcontroller 23 starts executing the control routine shown in FIG. 16. Alternatively, at the time when the process of inputting the image data of FIG. 13 is completed, the main controller 20 transmits a control signal to the subcontroller 23, and the index print production process is started automatically at the timing when the subcontroller 23 receives the control signal.

First, in step 320 of the main routine shown in FIG. 16, the subroutine (FIG. 17) for producing the shading correction data is executed.

Figure 17:
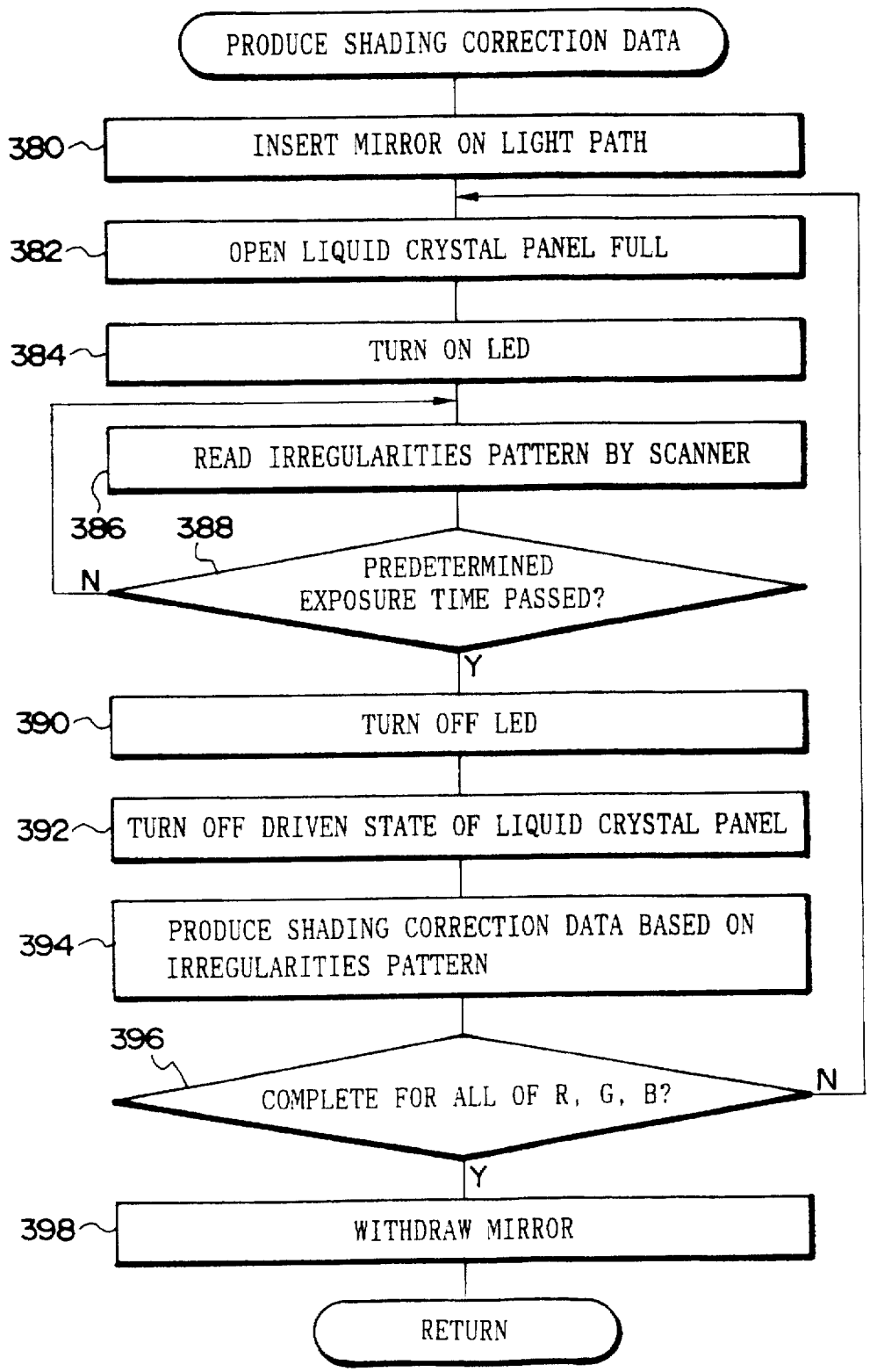
FIG. 17 is a flowchart showing a subroutine for producing shading data.

In step 380 of FIG. 17, the mirror 120 is inserted on the light path by the mirror driver 122, followed by step 382 for setting all the pixels of the liquid crystal panel 31 in full transmission state. In the next step 384, the LED light source for one of the color components R, G, B is turned on. The liquid crystal panel 31 is full open. Therefore, all the parallel components of the light from the LED light source, which are passed through the exposure lens 35, are reflected by the mirror 120 and reach the reading surface of the scanner 124.

In the next step 386, the image formed by the light from the LED light source is read by the scanner 124. This read operation is continued for a predetermined length of exposure time in step 388. After the lapse of the predetermined exposure time, step 390 turns off the LED light source. In the next step 392, the display on the liquid crystal panel 31 is canceled, after which the process proceeds to step 394 where the shading correction data are produced on the basis of the irregularities pattern read in step 386.

For example, density is measured at measuring points in the irregularities pattern corresponding to all the pixels of the liquid crystal panel 31. The highest density $D_{max}$ and the lowest density $D_{min}$ of all the density measurements are determined. With an intermediate value $D_{mid}\{=(D_{max}+D_{min})/2\}$ as a reference, the shading correction data, i.e., the light transmittance correction amount for the pixels of the liquid crystal panel 31 corresponding to the respective measuring points is calculated in such a manner that the densities at all the measuring points assume the intermediate value $D_{mid}$. The shading correction according to the invention is not limited to the one with the intermediate value $D_{mid}$ set as a reference, but the invention is applicable with equal effect to the case in which the shading correction is accomplished with the highest density $D_{max}$, the lowest density $D_{min}$ or a predetermined density as a reference As described above, the shading correction data on one of the color components R, G, B is calculated.

After that, steps 382 to 394 are executed thereby to calculate the shading correction data for each color R, G, B. After withdrawing the mirror 120 from the light path in step 398, the process returns to the main routine of FIG. 16.

Figure 18:
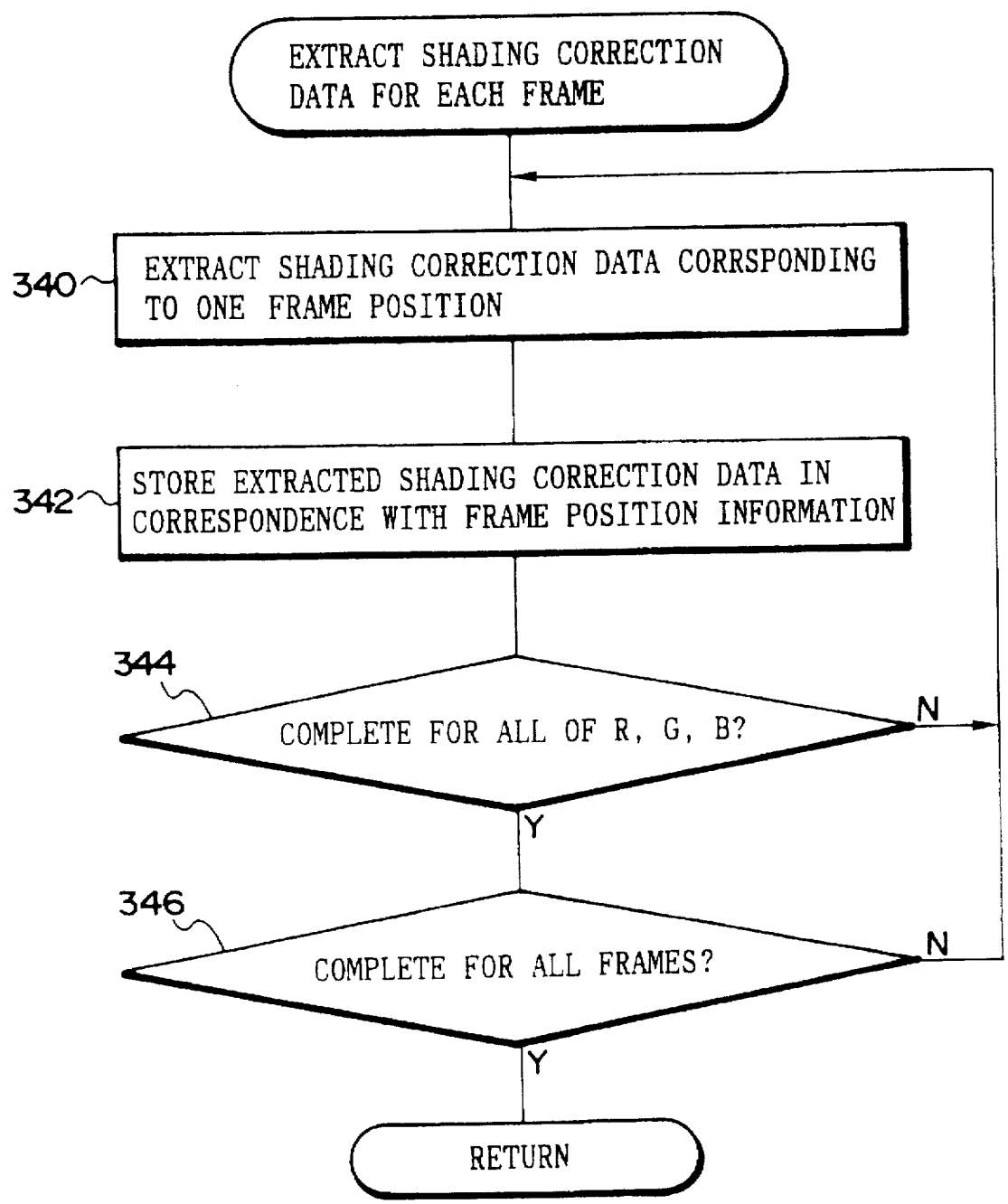
FIG. 18 is a flowchart showing a subroutine for extracting the shading correction data for each frame.

After returning to FIG. 16, the next step 322 executes the subroutine for extracting the shading correction data for each frame (FIG. 18).

In step 340 of FIG. 18, the shading correction data corresponding to one frame position (the frame image K01 in FIG. 15D, for example) is extracted, followed by step 342 in which the extracted shading correction data are matched with the frame position information and stored in the image memory 106. Steps 340 to 342 are executed for each of the color components R, G, B of a given frame. Upon complete execution of these steps for each color R, G, B of a given frame, the same process is executed for the next frame.

In this way, the process is progressively executed from one frame to another, and upon complete execution of steps 340 and 342 on all the frames of the whole negative film 16, the process returns to the main routine shown in FIG. 16.

After the process returns to FIG. 16, step 324 executes the subroutine (FIG. 19) for shading correction and index print data production.

Figure 19:
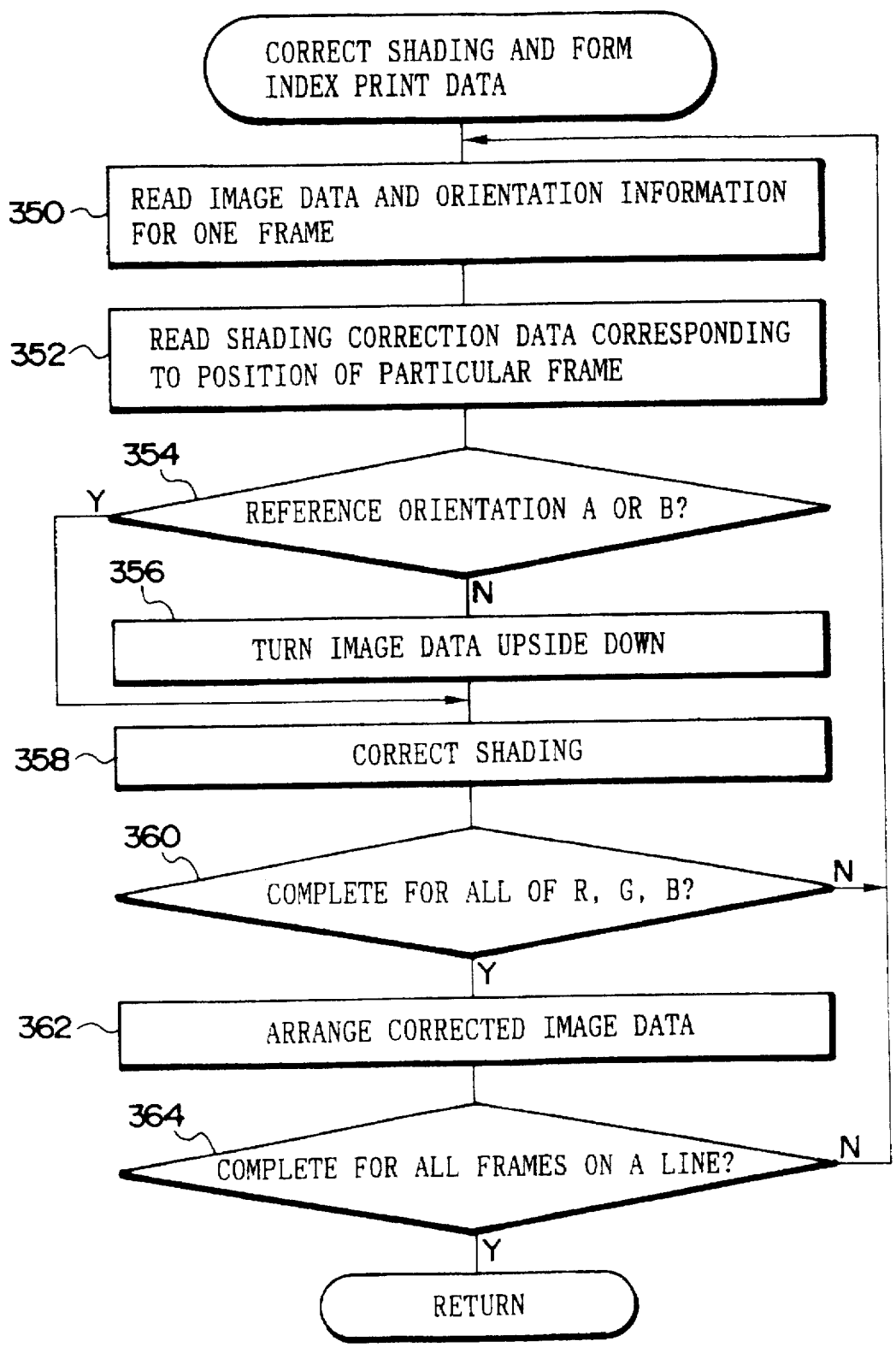
FIG. 19 is a flowchart showing a subroutine for correcting the shading and forming index print data.

In step 350 of FIG. 19, the image data and the orientation information for a given single frame are read out from the image memory 106, followed by step 352 where the shading data extracted by the shading correction data extraction process (FIG. 18) described above and corresponding to the particular frame position are read from the image memory 106.

Figure 15C:
FIG. 15C is a diagram showing a frame image not in a reference orientation.

Step 354 decides whether the frame image of the particular frame assumes the reference orientation A or B on the basis of the orientation information read in step 350. In the case where the frame image is at reference orientation A or B (like the frame K01 of FIG. 15A, or the frame image K06 of FIG. 15B, for example), the orientation change of the frame image is not required, and therefore the process proceeds to step 358. In the case where the frame image is not at reference orientation A or B (like the frame image K11 in FIG. 15C, for example), by contrast, the process proceeds to step 356 where the particular frame image is turned upside down. As a result, the frame image K11 of FIG. 15C is vertically reversed as shown in FIG. 15D and is oriented to the same direction as the frame image K06.

Step 358 corrects the shading of the frame image. Specifically, the light transmittance for displaying the image data of the frame image on the liquid crystal panel 31 is corrected by the shading correction data corresponding to the particular frame position, and the image data corresponding to the corrected light transmittance (the corrected image data) is formed. The process of steps 350 to 358 is executed for each color of R, G, B for a given frame.

In the above-mentioned embodiments, the shading is corrected frame by frame, and therefore the time for each shading correction is reduced. It is thus possible to avoid the case in which the CPU of the subcontroller 23 is kept bound to the process of shading correction over a protracted length of time.

Figure 15D:
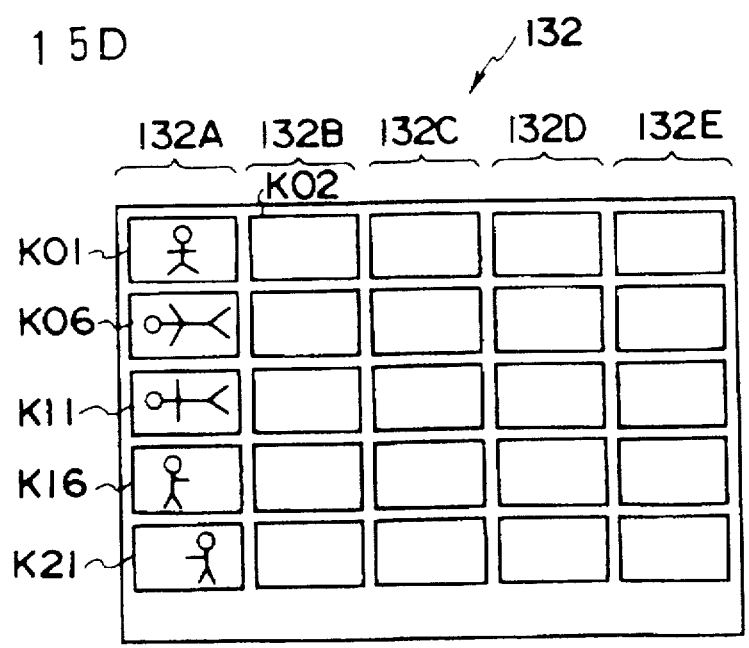
FIG. 15D is a diagram showing an example of index print data.

Upon complete execution of shading correction for all the colors, the process proceeds to step 362, where as shown in FIG. 15D, the corrected image data are arranged at a predetermined position of the index print data 132 developed in the RAM of the subcontroller 23. The corrected image data of each frame may alternatively be stored in the image memory 106 in correspondence with the frame position information.

Further, the shading correction for each color R, G, B is executed for each line of frame images (the frame images K01, K06, K11, K16, K21 on line 132A in FIGS. 15D and 21, for example) in the index print data shown in FIG. 15D. The shading correction is not executed, however, for the field 132X other than the frame image on line 132A shown in FIG. 21.

Upon complete shading correction for a line of all the frame images (the frame images K01, K08, K15, K22 and K29 on line 132A, for example), an affirmative answer is determined in step 364, and then the process returns to the main routine of FIG. 16.

Figure 20:
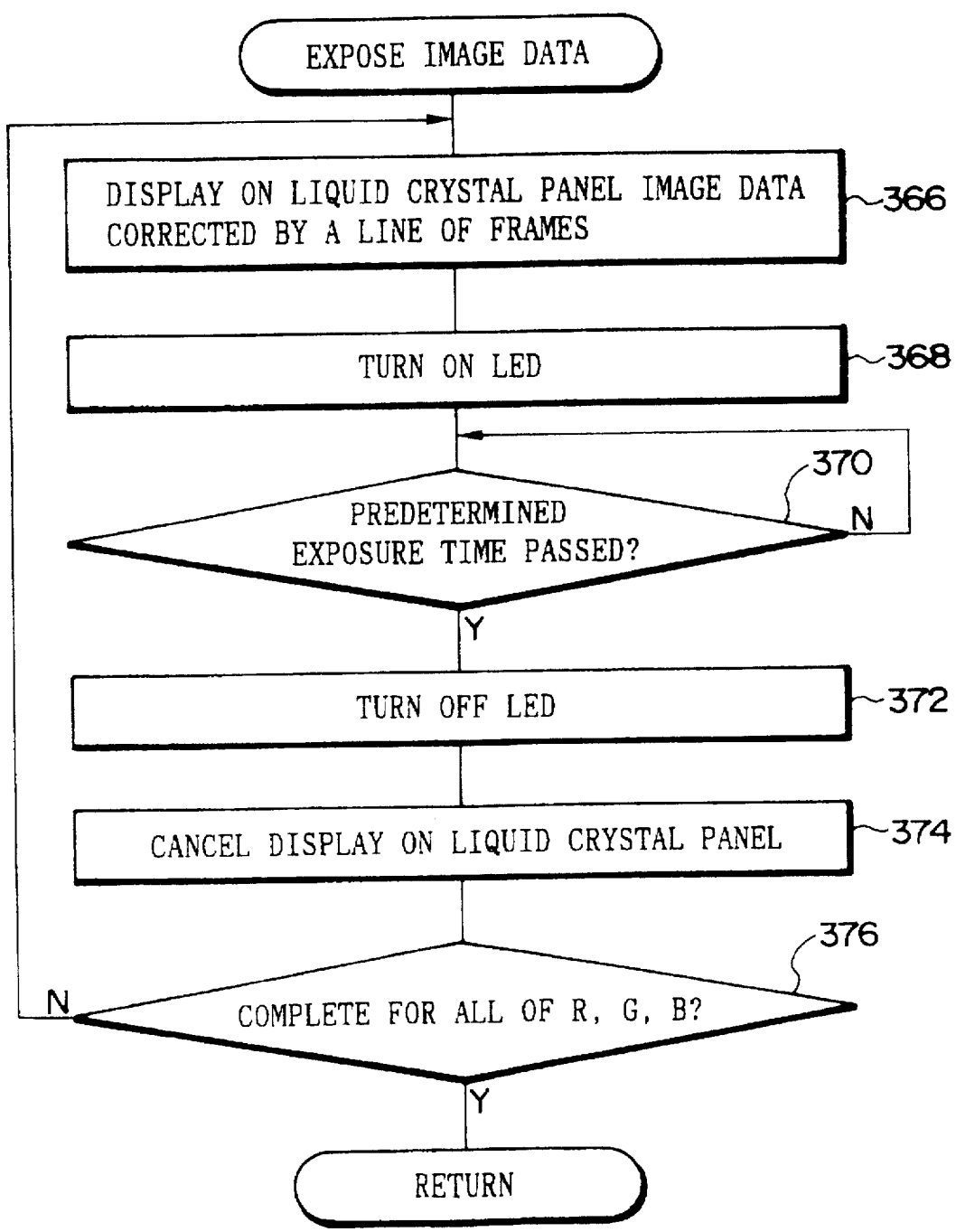
FIG. 20 is a flowchart showing a subroutine for exposing image data.
Figure 21:
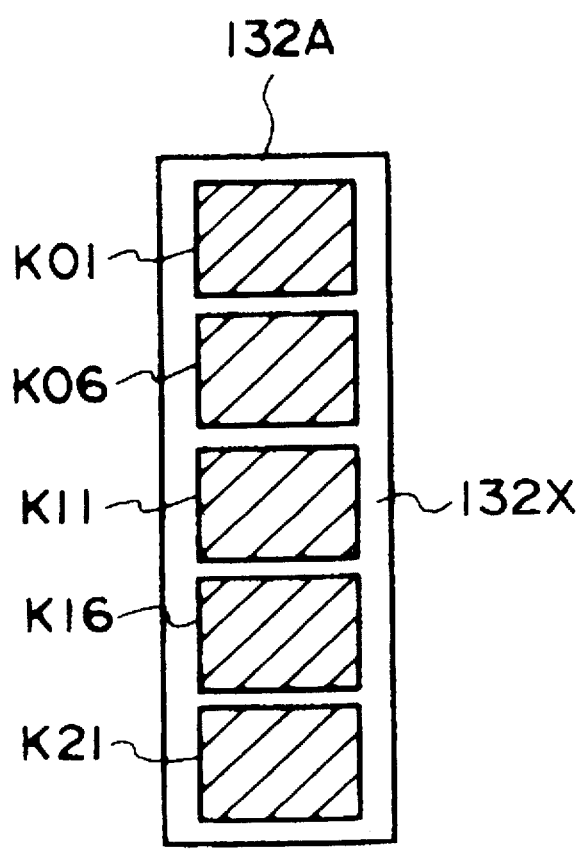
FIG. 21 is a diagram showing the range of shading correction for a line of index print data.

Upon return to FIG. 16, the next step 326 executes the subroutine for the image data exposure (FIG. 20).

In step 366 of FIG. 20, the corrected image data for a line of frames (five frames) is displayed on the liquid crystal panel 31 for each color of R, G, B. In the next steps 368 to 372, the LED light source corresponding to the same color component as the displayed image data is turned on for a predetermined exposure time $t_0$, thereby exposing on the printing paper 54 the corrected image data displayed in step 366. The display of the liquid crystal panel 31 is canceled in step 374.

Steps 366 to 374 are executed for each color component of R, G, B. Upon complete execution of the steps for all the color components R, G, B, a line of frame images displayed in step 366 are completely exposed on the printing paper 54.

The process returns to the main routine of FIG. 16, where step 328 decides whether the shading correction and the index print data production of step 324 and the image data exposure process of step 326 have all been completed or not for all the index print data. In the case where these processes are not yet complete for all the index print data, the process is passed to step 330, where in order to expose a line of frame images (the frame images included in line 132B following line 132A, for example) on the printing paper 54,
the printer paper 54 is transported by the distance corresponding to a line of image data. Then, the process returns to step 324 for performing the shading correction and the index print data production for the next line of frame images, followed by step 326 for exposing the frame images associated with the same line.

In this way, the processes of shading correction, index print data production and exposure are performed line by line for the index print data, and upon complete execution of the processes for all the index print data, the decision is affirmative in step 328 and the process proceeds to step 332. In step 332, the processes of development, fixing, washing and drying are performed on the printing paper 54 exposed to the index print data, thereby producing an index print.

The image data exposed in the above-mentioned index print production process, i.e., each frame image displayed on the liquid crystal panel 31 in step 366 of FIG. 20 has already been subjected to the shading correction. The index print thus produced, therefore, develops no print irregularities due to the light amount variations among the LEDs making up the LED light source or the variations of the light amount transmitted through different portions of the exposure lens 35.

According to this embodiment, the shading of only the portions of the index print data with frame images arranged thereon is corrected frame by frame on the basis of the corresponding shading correction data. Therefore, the shading correction can be eliminated for the portions not printed with frame images, thereby reducing the burden of shading correction.

The position of the scanner for reading the irregularities pattern is not confined to the one shown in FIG. 9. Alternatively, the scanner may be arranged on the exposure light axis X to directly read the image formed by the light transmitted through the liquid crystal panel 31. As another alternative, a test print is produced by exposing the printing paper 54 with the liquid crystal panel 31 set in full transmission state, and the density distribution of this test print is measured by a paper density measuring unit 90 thereby to detect an irregularities pattern.

Although the above-mentioned embodiments refer to applications of the present invention to a printer processor comprising a subprint unit, the invention is applicable with equal effect to a photographic print system comprising an index printer and a paper processor independent of each other, or a liquid crystal photographic printer comprising an image memory, a liquid crystal panel for displaying the image data stored in the image memory and an exposure system capable of exposing the image displayed on the liquid crystal panel.

According to the seventh aspect of the invention, the shading is corrected not for the entire image display field of a two-dimensional display unit but only for the portion with frame images arranged thereon, and therefore the burden of shading correction can be reduced. In the process, the processing time for shading correction can be reduced while at the same time saving the memory capacity for storing the shading correction data required for execution of the shading correction process.

According to the eighth aspect of the invention, on the other hand, the burden of the shading correction process is reduced. Also, since the shading correction is performed for each frame image, the unit processing time for executing the shading correction is shortened, thereby making it possible to avoid the case of continuous exclusive use of a CPU over a protracted time length.

While the embodiments of the present invention, as herein disclosed, constitute a preferred form, it is to be understood that other forms might be adopted.

What is claimed is:

1. A shading correction method for a photographic printer in which an image is displayed on a two-dimensional display unit by controlling each pixel of the two-dimensional display unit in accordance with an image data signal, the light from a light source is irradiated on the two-dimensional display unit with the image displayed thereon, and said image is exposed on a photosensitive material by the light transmitted through or reflected from said two-dimensional display unit, the method comprising the steps of:

turning on the light source by setting all the pixels of said two-dimensional display unit to a predetermined driven state;

measuring the density of each pixel of the image formed by the light transmitted through or reflected from the two-dimensional display unit corresponding to each pixel of said two-dimensional display unit;

calculating the correction amount of the light transmittance or the light reflectance of each pixel of said two-dimensional display unit on the basis of the density of each pixel of the image corresponding to each pixel of the two-dimensional display unit; and correcting selected one of the image data signal and the driving conditions of each pixel at the time of displaying an image on the two-dimensional display unit on the basis of the correction amount of the light transmittance or the light reflectance.

2. A shading correction method according to claim 1, wherein the driving voltage of each pixel is corrected in order to correct the driving conditions of each pixel of said two-dimensional display unit.

3. A shading correction method according to claim 1, wherein said predetermined driven state set for all the pixels of the two-dimensional display unit is selected one of full transmittance state and full reflection state.

4. A shading correction method according to claim 1, wherein the correction amount of selected one of light transmittance and light reflectance for each pixel of the two-dimensional display unit is calculated in such a manner that the densities of all the pixels conform to a predetermined reference density.

5. A shading correction method according to claim 4, wherein said predetermined reference density is selected one of the minimum density, the maximum density, the average value, and the intermediate value between the minimum and the maximum of each pixel measured.

6. A shading correction method according to claim 1, wherein the density of each pixel of the image corresponding to each pixel of said two-dimensional display unit is measured from a photographic print on which said image has been exposed and developed.

7. A shading correction method according to claim 1, wherein the density of each pixel of the image corresponding to each pixel of said two-dimensional display unit is measured from the exposure light before being irradiated on a photosensitive material.

8. A shading correction method for a photographic printer in which an image is displayed on a liquid crystal panel by controlling each pixel of the liquid crystal panel according to an image data signal, the light from a light source is irradiated on the liquid crystal panel with said image displayed thereon, and said image is exposed on a photosensitive material by the light transmitted through said liquid crystal panel, the method comprising the steps of:

turning on the light source by setting all the pixels of the liquid crystal panel to a predetermined driven state;

measuring the density of each pixel of the image formed by the light transmitted through said liquid crystal panel corresponding to each pixel of said liquid crystal panel;

calculating the light transmittance correction amount for each pixel of the liquid crystal panel on the basis of the density of each pixel of the image corresponding to each pixel of the liquid crystal panel; and correcting selected one of the image data signal and the driving conditions of each pixel for displaying an image on the liquid crystal panel on the basis of the light transmittance correction amount.

9. A photographic printer for displaying an image on a two-dimensional display unit by controlling each pixel of the two-dimensional display unit according to an image data signal, irradiating the light from a light source on the two-dimensional display unit with said image displayed thereon, and exposing said image on a photosensitive material by the light transmitted through or reflected from said two-dimensional display unit, said photographic printer comprising:

density measuring means for setting all the pixels of said two-dimensional display unit to a predetermined driven state and measuring the density of each pixel of the image formed by the light transmitted through or reflected from the two-dimensional display unit corresponding to each pixel of said two-dimensional display unit;

correction amount calculation means for calculating the correction amount of selected one of the light transmittance and the light reflectance of each pixel of the two-dimensional display unit on the basis of the density of each pixel measured by said density measuring means; and correction control means for correcting selected one of the image data signal and the driving conditions of each pixel for displaying an image on the two-dimensional display unit on the basis of the correction amount of selected one of the light transmittance and the light reflectance calculated by said correction amount calculation means.

10. A photographic printer according to claim 9, wherein said correction control means corrects the driving voltage of each pixel of said two-dimensional display unit thereby to correct the driving conditions of each pixel of said two-dimensional display unit.

11. A photographic printer according to claim 9, wherein said density measuring means sets all the pixels of said two-dimensional display unit to selected one of full transmission state and full reflection state as said predetermined driven state.

12. A photographic printer according to claim 9, wherein said correction amount calculation means calculates the correction amount of selected one of the light transmittance and the light reflectance of each pixel of said two-dimensional display unit in such a manner that the densities of all the pixels conform to a predetermined reference density.

13. A photographic printer according to claim 12, wherein said predetermined reference density is selected one of a minimum density, a maximum density, an average density and an intermediate density between said maximum and minimum densities of each pixel measured.

14. A photographic printer according to claim 9, wherein said density measuring means is adapted to measure the density of a photographic print with said image exposed and developed.

15. A photographic printer according to claim 9, wherein said density measuring means is a scanner for measuring the exposure light before being irradiated on a photosensitive material.

16. A photographic printer for displaying an image on a liquid crystal panel by controlling each pixel of said liquid crystal panel in accordance with an image data signal, irradiating the light from a light source on the liquid crystal panel with said image displayed thereon, and exposing said image on a photosensitive material by the light transmitted through said liquid crystal panel, said photographic printer comprising:

liquid crystal density measuring means for measuring the density of each pixel of the image formed by the light transmitted through said liquid crystal panel corresponding to each pixel of said liquid crystal panel by setting all the pixels of said liquid crystal panel to a predetermined driven state;

transmittance correction amount calculation means for calculating the light transmittance correction amount for each pixel of said liquid crystal panel on the basis of the density of each pixel measured by said liquid crystal density measuring means; and liquid crystal pixel correction control means for correcting selected one of the image data signal and the driving conditions of each pixel for displaying an image on said liquid crystal panel on the basis of the light transmittance correction amount calculated by said transmittance correction amount calculation means.

17. A shading correction method for correcting the shading by adjusting selected one of the light transmittance and the light reflectance of the pixels of a two-dimensional display unit on the basis of the shading correction data for an image display field of said two-dimensional display unit at the time of producing an index print by displaying on said two-dimensional display unit an image including a predetermined number of frame images arranged in a predetermined manner and recorded in a photographic film and exposing said image, wherein only the portion of said image display field with said frame images arranged thereon is subjected to the shading correction.

18. A shading correction method for correcting the shading by adjusting the light transmittance of the pixels of a liquid crystal panel on the basis of the shading correction data for an image display field of said liquid crystal panel at the time of producing an index print by displaying on said liquid crystal panel an image including a predetermined number of frame images arranged in a predetermined manner and recorded in a photographic film, wherein only the portion of said image display field with said frame images arranged thereon is subjected to the shading correction.

19. An index print production apparatus for producing an index print by displaying on a two-dimensional display unit an image including a predetermined number of frame images arranged in a predetermined manner and recorded in a photographic film and exposing said image, said index print production apparatus comprising:

correction data production means for detecting the irregularities of the light amount transmitted through or reflected from an image display field of said two-dimensional display unit and producing the shading correction data as selected one of the light transmittance adjustment amount and the light reflectance adjustment amount for each pixel of said image display field;

extraction means for extracting the shading correction data corresponding to the positions of said frame images from the shading correction data for said image display field produced by said correction data production means; and correction means for correcting the shading by adjusting selected one of the light transmittance and the light reflectance of the pixels of said two-dimensional display unit for each frame image on the basis of the shading correction data of each frame image extracted by said extraction means.

20. An index print production apparatus for producing an index print by displaying on a liquid crystal panel and exposing an image including a predetermined number of frame images arranged in a predetermined manner and recorded in a photographic film, said index print production apparatus comprising:

shading correction data production means for detecting the irregularities of the light amount transmitted through an image display field of said liquid display panel and producing the shading correction data as a light transmittance adjustment amount for each pixel of said image display field;

shading correction data extraction means for extracting the shading correction data corresponding to the positions of said frame images from the shading correction data for said image display field produced by said correction data production means; and shading correction means for correcting the shading by adjusting the light transmittance of the pixels of said liquid crystal panel for each frame image on the basis of the shading correction data of each frame image extracted by said extraction means.

* * * * *